(12) United States Patent
Huang et al.

(10) Patent No.: US 12,510,099 B1
(45) Date of Patent: Dec. 30, 2025

(54) AIR OUTLET DEVICE AND FAN

(71) Applicant: Shenzhen Hesung Intelligence Limited, Guangdong (CN)

(72) Inventors: Taiyi Huang, Guangdong (CN); Xun Deng, Guangdong (CN); Xianglu Dai, Guangdong (CN)

(73) Assignee: SHENZHEN HESUNG INTELLIGENCE LIMITED, Guangdong (CN)

( * ) Notice: Subject to any disclaimer, the term of this patent is extended or adjusted under 35 U.S.C. 154(b) by 0 days.

(21) Appl. No.: 19/288,302

(22) Filed: Aug. 1, 2025

(30) Foreign Application Priority Data

May 29, 2025 (CN) .......................... 202510708864.7

(51) Int. Cl.
| | |
|---|---|
| *F04D 29/60* | (2006.01) |
| *F04D 19/00* | (2006.01) |
| *F04D 25/06* | (2006.01) |
| *F04D 25/08* | (2006.01) |
| *F04D 29/40* | (2006.01) |
| *F04D 29/64* | (2006.01) |
| *F16M 11/04* | (2006.01) |
| *F16M 11/10* | (2006.01) |
| *F16M 11/24* | (2006.01) |

(Continued)

(52) U.S. Cl.
CPC .......... *F04D 29/601* (2013.01); *F04D 19/002* (2013.01); *F04D 25/0673* (2013.01); *F04D 25/08* (2013.01); *F04D 29/403* (2013.01); *F04D 29/644* (2013.01); *F04D 29/646* (2013.01); *F16M 11/041* (2013.01); *F16M 11/10* (2013.01); *F16M 11/242* (2013.01); *F16M 11/28* (2013.01); *F16M 11/32* (2013.01)

(58) Field of Classification Search
CPC .. F04D 29/644; F04D 19/002; F04D 25/0673; F04D 25/08; F04D 29/403; F04D 29/601; F04D 29/646; F16M 11/041; F16M 11/10; F16M 11/242; F16M 11/28; F16M 11/32
See application file for complete search history.

(56) References Cited

U.S. PATENT DOCUMENTS 10,837,460 B2 * 11/2020 Ediger .................. F04D 29/403
11,506,223 B2 * 11/2022 Ediger .................. F04D 29/403
(Continued)

*Primary Examiner* — Peter J Bertheaud
(74) *Attorney, Agent, or Firm* — Scully, Scott, Murphy & Presser, P.C.

(57) ABSTRACT

An air outlet device and a fan are provided. The air outlet device includes an air outlet module and a support module. The air outlet module is used for blowing air outward. The support module has an unfolded state and a folded state. The support module includes a linkage assembly and multiple support assemblies connected to the linkage assembly and arranged along the circumferential direction of the linkage assembly. In the folded state, at least part of the linkage assembly protrudes from multiple support assemblies along the direction away from the air outlet module. When the linkage assembly is subjected to a force along the direction toward the air outlet module, the linkage assembly moves along the direction close to the air outlet module and drives multiple support assemblies to rotate synchronously along directions away from each other, thus making the support module in the unfolded state.

16 Claims, 15 Drawing Sheets

(51) Int. Cl.
  *F16M 11/28* (2006.01)
  *F16M 11/32* (2006.01)

(56) References Cited

U.S. PATENT DOCUMENTS

| | | | |
|---|---|---|---|
| 2024/0072707 A1* | 2/2024 | Strommen | F04D 27/004 |
| 2025/0075704 A1* | 3/2025 | Mathias | F24F 5/0035 |

* cited by examiner

AIR OUTLET DEVICE AND FAN

CROSS-REFERENCE TO RELATED APPLICATION(S)

Present application claims priority to Chinese Patent Application No. 202510708864.7, filed May 29, 2025, the entire disclosures of which are incorporated herein by reference.

TECHNICAL FIELD

Present application relates to the technical field of fan, and in particular to an air outlet device and fan.

BACKGROUND

A fan is a device that can blow air into the external environment, thus to improve the temperature of the external environment and enhance the overall comfortableness of users. The air outlet device in the fan has a folded state and an unfolded state, there is need to manually extend multiple support assemblies in sequence when the air outlet device is changed from the folded state to the unfolded state, which is inconvenient for users to operate.

SUMMARY

In view of this, the first aspect of the present application provides an air outlet device, the air outlet device includes an air outlet module and a support module connected with each other, the air outlet module is used for blowing air outward, the support module has an unfolded state and a folded state, and the support module includes a linkage assembly and multiple support assemblies, the multiple support assemblies are arranged along a circumferential direction of the linkage assembly and are all connected to the linkage assembly.

Therein, when the support module is in the folded state, at least part of the linkage assembly protrudes from the multiple support assemblies along a direction away from the air outlet module, when the linkage assembly is subjected to a force in a direction toward the air outlet module, the linkage assembly moves in a direction close to the air outlet module, and drives the multiple support assembly to rotate synchronously in directions that are away from each other, thereby making the support module in the unfolded state and enabling the multiple support assemblies to be supported on a supporting surface use for supporting.

On this basis, the support module further includes a shell assembly connected to the air outlet module, the linkage assembly is arranged on a side of the shell assembly away from the air outlet module, each support assembly includes a support member and a connecting member. The support member is rotatably connected to the shell assembly, and a first end of the connecting member is rotatably connected to the support member, and a second end of the connecting member is rotatably connected to the linkage assembly;

during a process of unfolding the support module, the linkage assembly moves in the direction close to the shell assembly, the second end of the connecting member rotates relative to the linkage assembly, the first end of the connecting member rotates relative to the support member, and the support member rotates relative to the shell assembly, thus to cause the support member rotates in a direction away from the linkage assembly;

during a process of folding the support module, the linkage assembly moves in a direction away from the shell assembly, the second end of the connecting member rotates relative to the linkage assembly in an opposite direction, the first end of the connecting member rotates relative to the support member in an opposite direction, and the support member rotates relative to the shell assembly in an opposite direction, thus to cause the support member to rotate in the direction close to the linkage assembly.

On this basis, the support member includes a side wall and a bottom wall that is bent connected to the side wall, the side wall is rotatably connected to the shell assembly and the first end of the connecting member. A first snap-on part is provided at the side of the linkage assembly that is away from the shell assembly, and a second snap-on part is provided at the bottom wall.

Therein, when the support module is in the folded state, the bottom wall is located at a side of the linkage assembly that is away from the shell assembly, and the first snap-on part and the second snap-on part cooperate with each other so that the support member is connected to the linkage assembly via a snap-on mode.

On this basis, the linkage assembly includes a bottom shell and an end cover installed on the bottom shell, the first snap-on part is arranged on the bottom shell, the end cover is rotatably connected to the second end of the connecting member, the bottom shell can move relative to the end cover along its axial direction, and when the support module is in the folded state, the bottom shell can be pressed against the supporting surface.

During the process of unfolding the support module, when pressure is applied to the bottom shell along a direction toward the supporting surface, the bottom shell moves relative to the end cover along the direction close to the shell assembly, thus to cause the first snap-on part to separate from the second snap-on part. Therein the bottom shell can also drive the end cover to move along the direction close to the shell assembly, which enables the multiple support assemblies to rotate synchronously in directions that are away from each other.

On this basis, the bottom shell is provided with a top contact part, and there is a distance between the top contact part and the end cover, when the pressure is applied to the bottom shell along the direction toward to the supporting surface, the bottom shell moves relative to the end cover along the direction close to the shell assembly, when the bottom shell moves a first distance relative to the end cover along the direction close to the shell assembly, the first snap-on part separates from the second snap-on part. When the bottom shell moves a second distance relative to the end cover along the direction close to the shell assembly, the top contact part contacts with the end cover, thereby enabling the bottom shell to drive the end cover to move together, therein, the first distance is less than the second distance.

On this basis, the linkage assembly further includes an elastic member arranged in the bottom shell, the end cover is provided with a guiding part, the elastic member is sleeved on the guiding part and two ends of the elastic member are connected to the end cover and the bottom shell respectively, and the bottom shell is provided with a through hole corresponding to the guiding part.

Therein, when the bottom shell moves relative to the end cover along the direction close to the shell assembly, the elastic member is in a compressed state, and the guiding part protrudes from the bottom shell through the through hole; when the bottom shell is separated from the supporting surface, the elastic member in the compressed state can drive the bottom shell to move in a direction away from the shell assembly.

On this basis, the support module further includes a shell assembly connected to the air outlet module, the linkage assembly is arranged on a side, of the shell assembly, that is away from the air outlet module. The shell assembly includes a shell and a protruding part arranged on a side, of the shell, that is away from the air outlet module, when the support module is in the unfolded state, the protruding part contacts with the linkage assembly.

The second aspect of the present application provides a fan, the fan includes a base module and an air outlet device as provided in the first aspect of the present application. The base module is used to be supported on a supporting surface, such as a floor, and the air outlet device is detachably connected to the base module. When the air outlet device is connected to the base module, the support module is in the folded state and at least part of the support module is located inside the base module, and at least part of the air outlet module is located outside the base module.

On this basis, the support module further comprises a shell assembly connected to the air outlet module, the linkage assembly is arranged on the side of the shell assembly away from the air outlet module, the air outlet module includes a first electrical connection terminal arranged in the shell assembly, the linkage assembly has a through hole, and when the support module is in the folded state, the multiple supporting assemblies are enclosed to form a containment space. The base module includes a base, a support rod, and a second electrical connection terminal, the base is used to be supported on the supporting surface, the support rod is arranged on the base, and the second electrical connection terminal is arranged inside the support rod.

Therein, when the air outlet device is connected to the base module, the end of the support rod passes through the linkage assembly through the through hole, and the first electrical connection terminal and the second electrical connection terminal are connected with each other in the containment space.

On this basis, the shell assembly comprises a shell and a protruding part arranged on the side of the shell away from the air outlet module, and the first electrical connection terminal is arranged in the protruding part. When the support module is in the unfolded state, the end of the protruding part and the first electrical connection terminal protrude from the linkage assembly, a connection hole is provided at the side wall of a part of the protruding part that is protruded from the linkage assembly, and a third electrical connection terminal is connected to the first electrical connection terminal through the connection hole. When the support module is in the unfolded state, a surface of the protruding part that is close to the supporting surface and surfaces of the multiple support assembles 50 that are close to the supporting surface are in one plane.

The air outlet device and fan provided in the present application, when the support module is in a folded state, at least part of the linkage assembly protrudes from multiple support assemblies along a direction far away from the air outlet module. Moreover, the linkage assembly in the support module that is in the folded state can be contacted with the supporting surface, that is, the linkage assembly are set further down to be contacted with the supporting surface. When the pressure is applied to the linkage assembly, the linkage assembly can move along the direction close to the air outlet module, due to the linkage assembly is connected to multiple support assemblies, the linkage assembly can drive the multiple support assemblies to rotate synchronously along the directions away from each other, thus making the support module in the unfolded state and enabling the multiple support assemblies to be supported on the supporting surface.

In conclusion, during the process of the support module to be unfolded and folded in this application, there is no need to make multiple support assemblies rotate in sequence. Through the cooperation of the linkage assembly, the multiple support assemblies can be driven to folded or unfolded by only controlling the linkage assembly to move, the operational difficulty for users thus is reduced.

BRIEF DESCRIPTION OF THE DRAWINGS

In order to more clearly illustrate the technical scheme of embodiments of the present application, brief introduction of the drawings required to be used in the embodiments are presented below.

ILLUSTRATION FOR LABELS OF THE DRAWINGS

Fan—1, base module—10, base—11, support rod—12, second electrical connection terminal—13, air outlet device—20a, air outlet module—20, support module—30, linkage assembly—40, through hole—400, first snap-on part—4000, bottom shell—41, contact part—410, top contact part—411, through hole—412, end cover—42, guide part—420, elastic part—43, support assembly—50, containment space—500, support member—51, side wall—511, bottom wall—512, second snap-on part—5120, first limit part—513, second limit part—514, connecting member—52, button—53, shell assembly—60 first electrical connection terminal—61, shell—62, protruding part—63, connection hole—630.

DETAILED DESCRIPTION

The following descriptions are the preferred embodiments of the present application. It should be noted that for ordinary technicians in this technical field, several improvements and embellishments can be made without departing from the spirit and principles of the present application, and these improvements and embellishments are also regarded as included in the protection range of the present disclosure.

Figure 1:
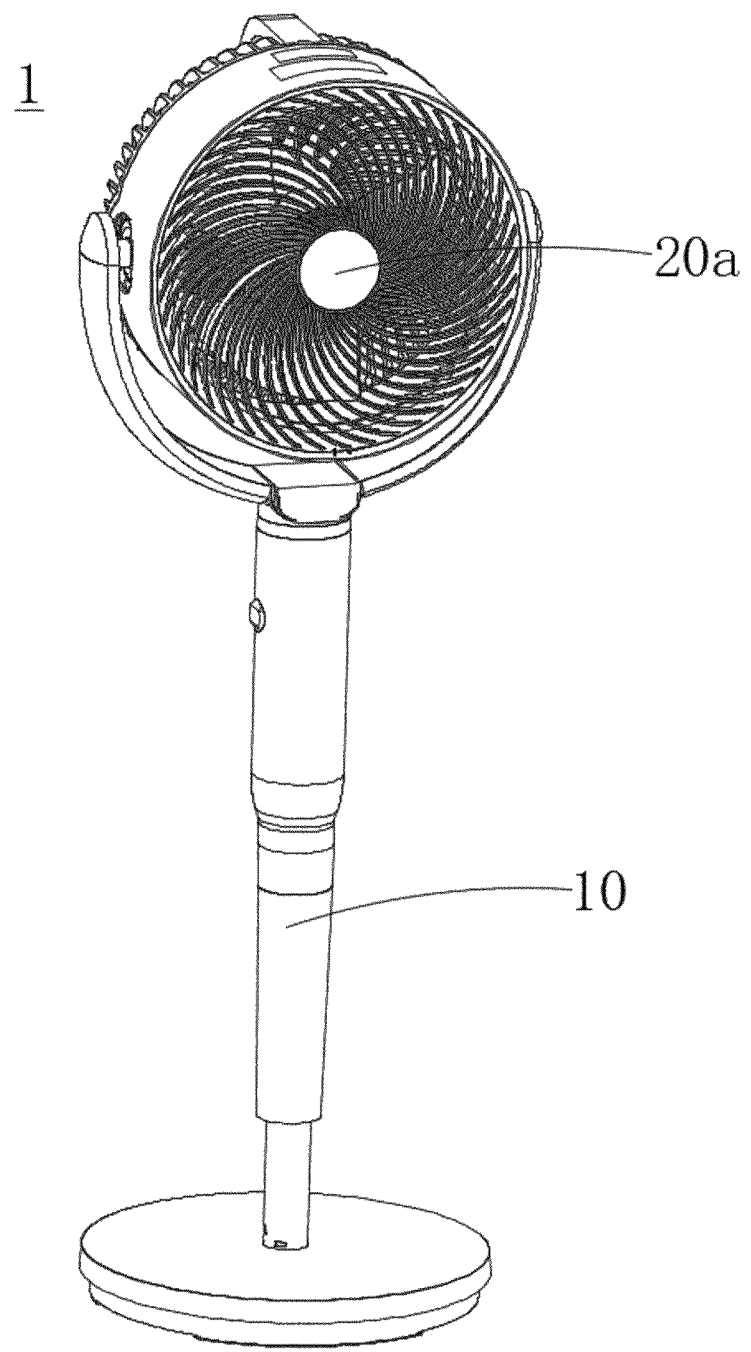
FIG. 1 is a three-dimensional structural schematic diagram of a fan when the fan is a pedestal fan, in one embodiment of the present application.
Figure 2:
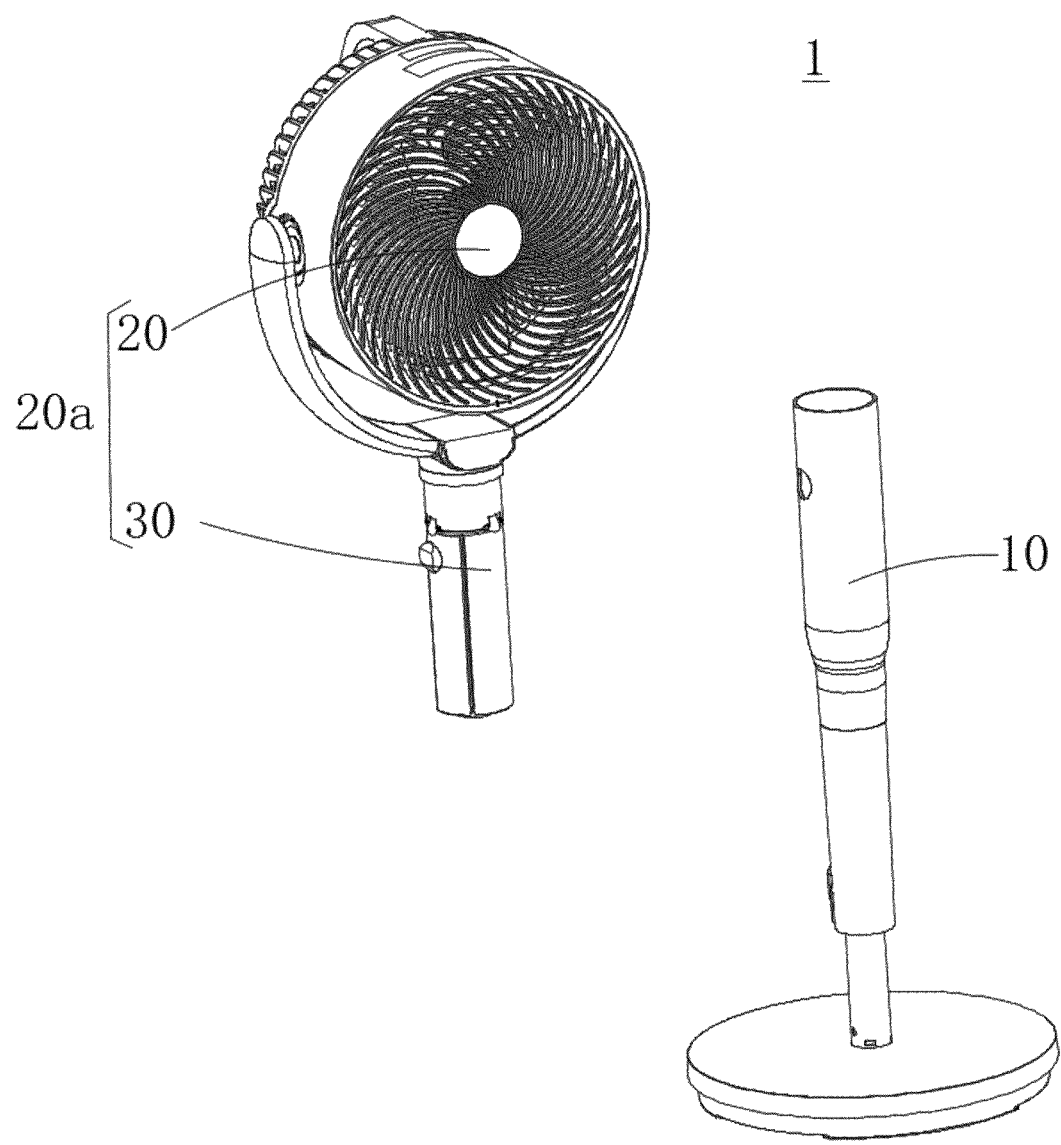
FIG. 2 is an explosion diagram of the pedestal fan shown in FIG. 1.
Figure 3:
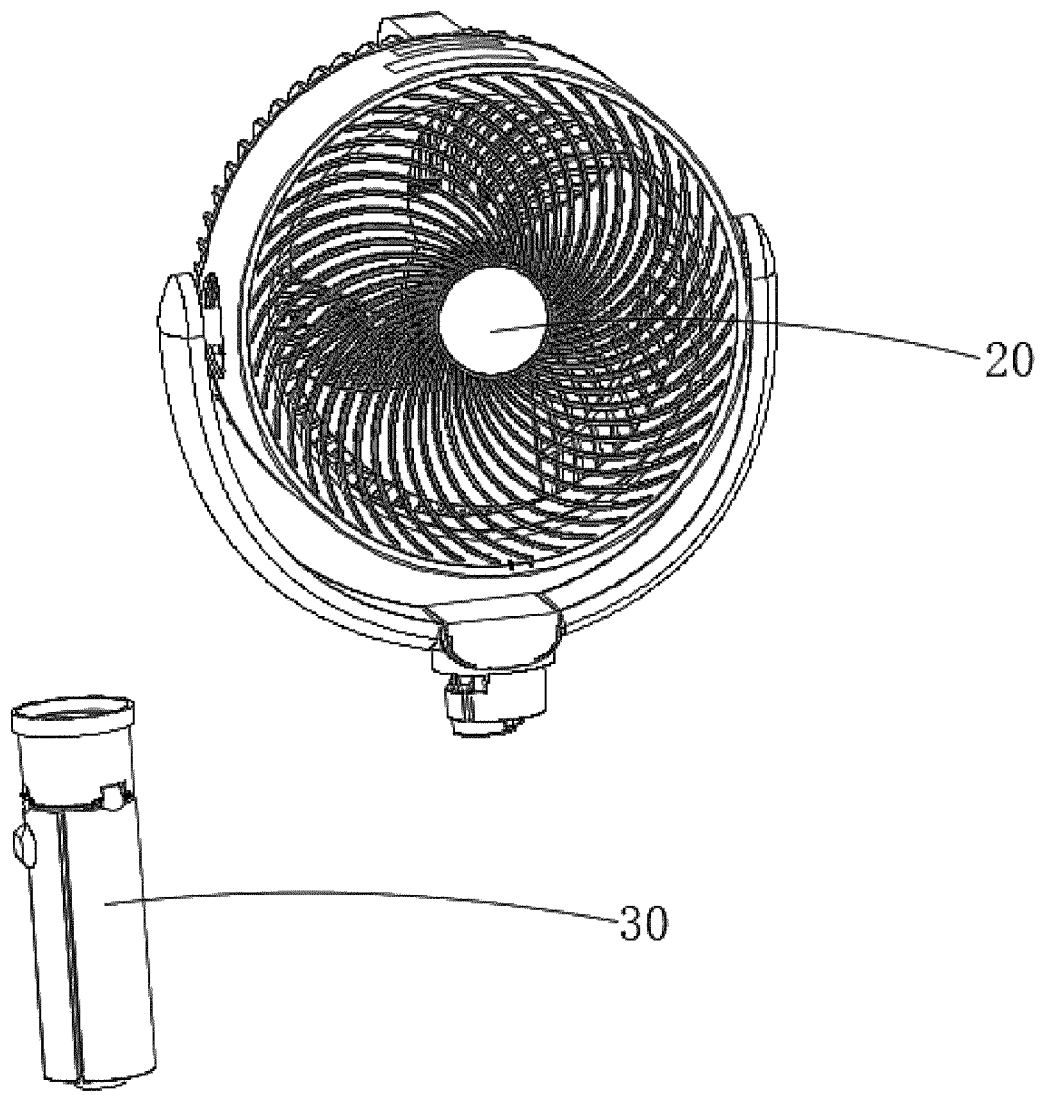
FIG. 3 is an explosion diagram of an air outlet device of the pedestal fan shown in FIG. 2.
Figure 4:
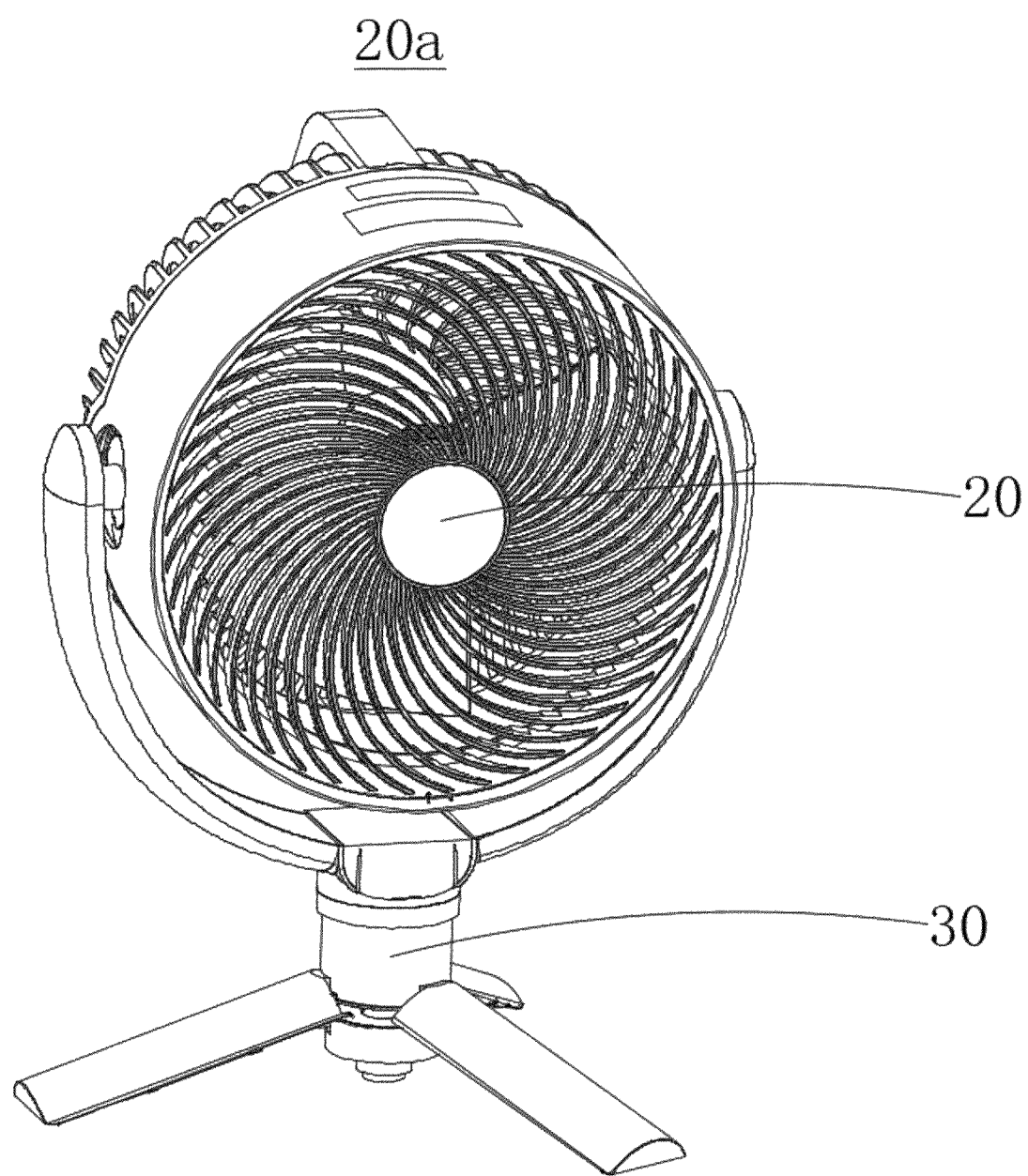
FIG. 4 is a three-dimensional structural schematic diagram of the fan when the fan is a desk fan, in one embodiment of the present application.
Figure 5:
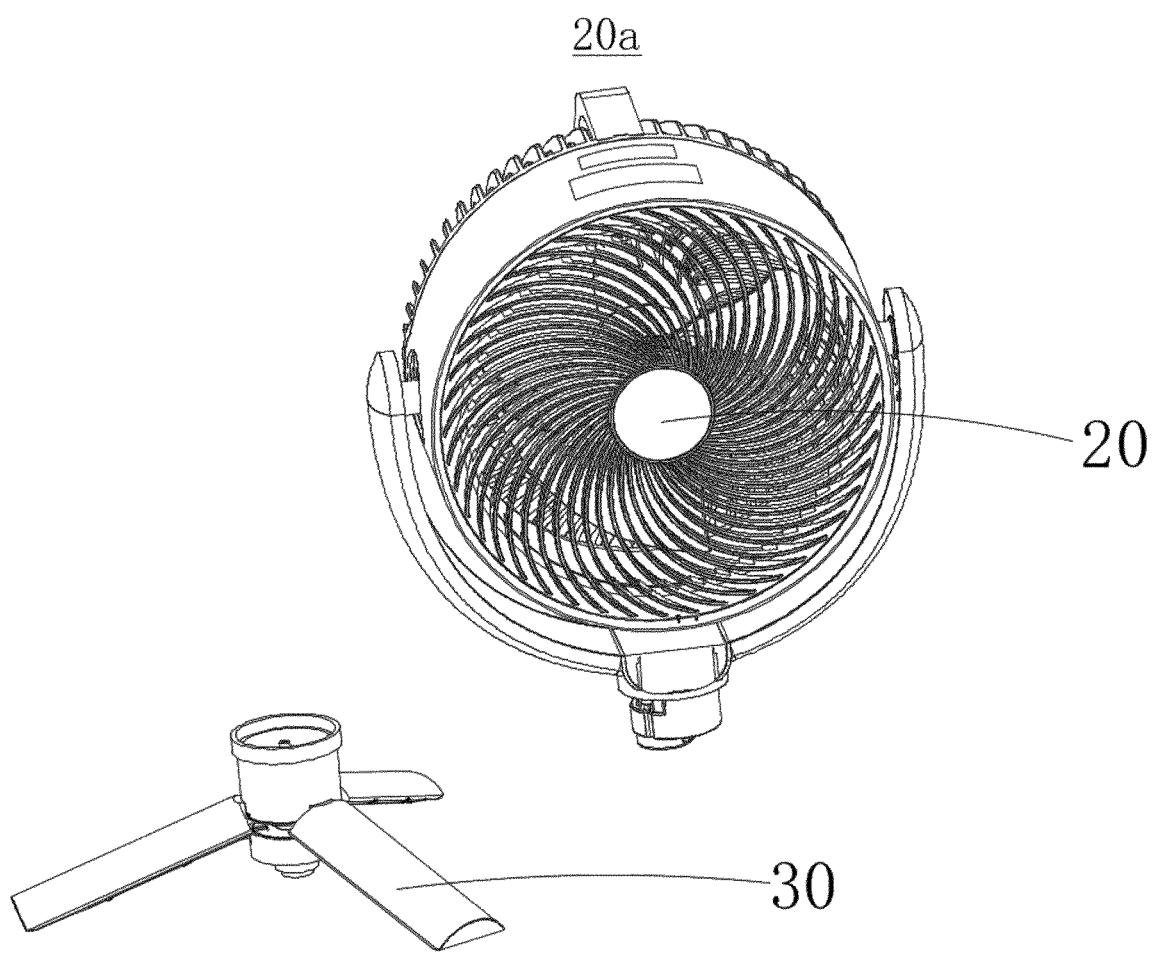
FIG. 5 is the explosion diagram of the desk fan shown in FIG. 4.
Figure 6:
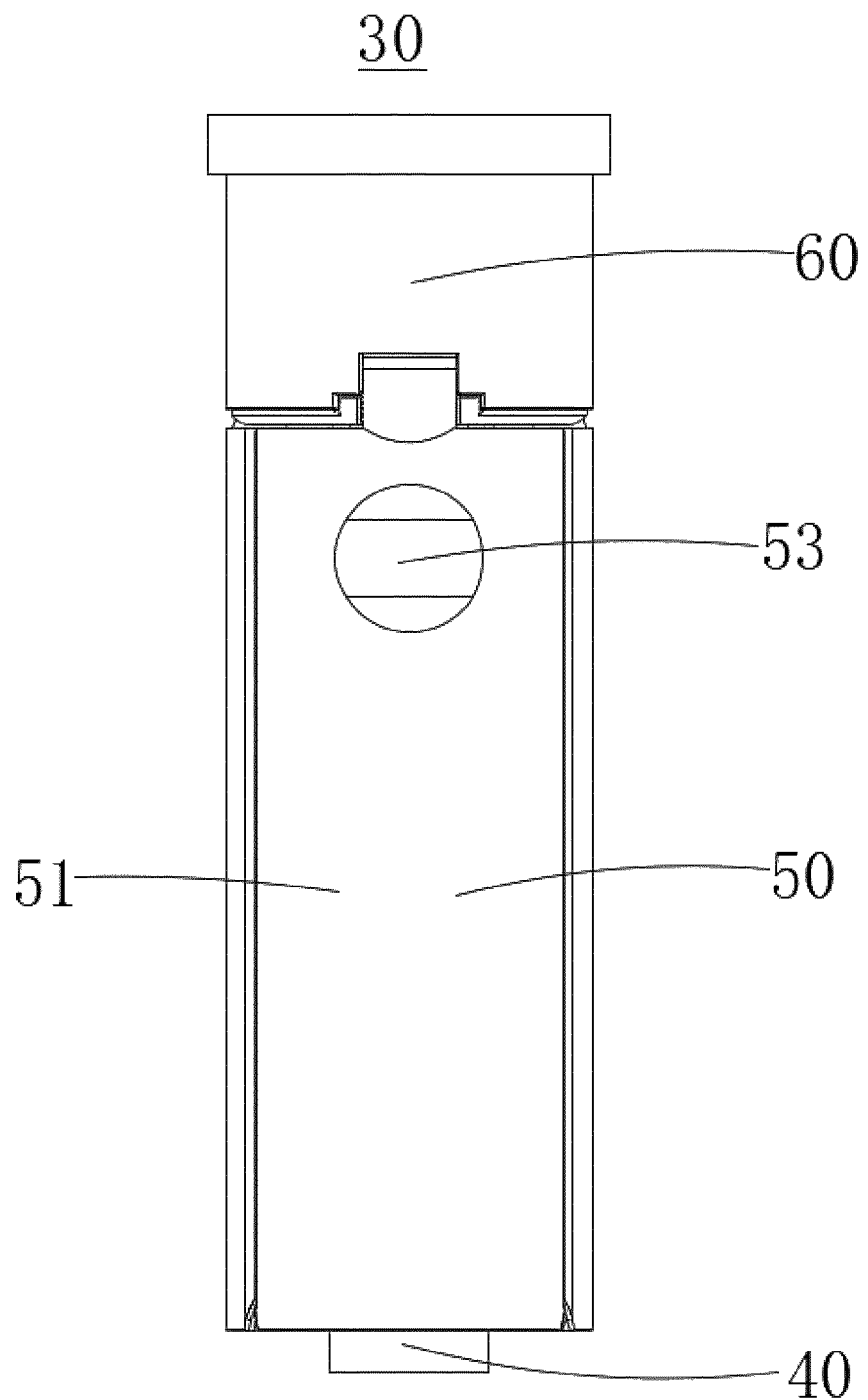
FIG. 6 is a front view of the support module in a folded state, in one embodiment of the present application.
Figure 7:
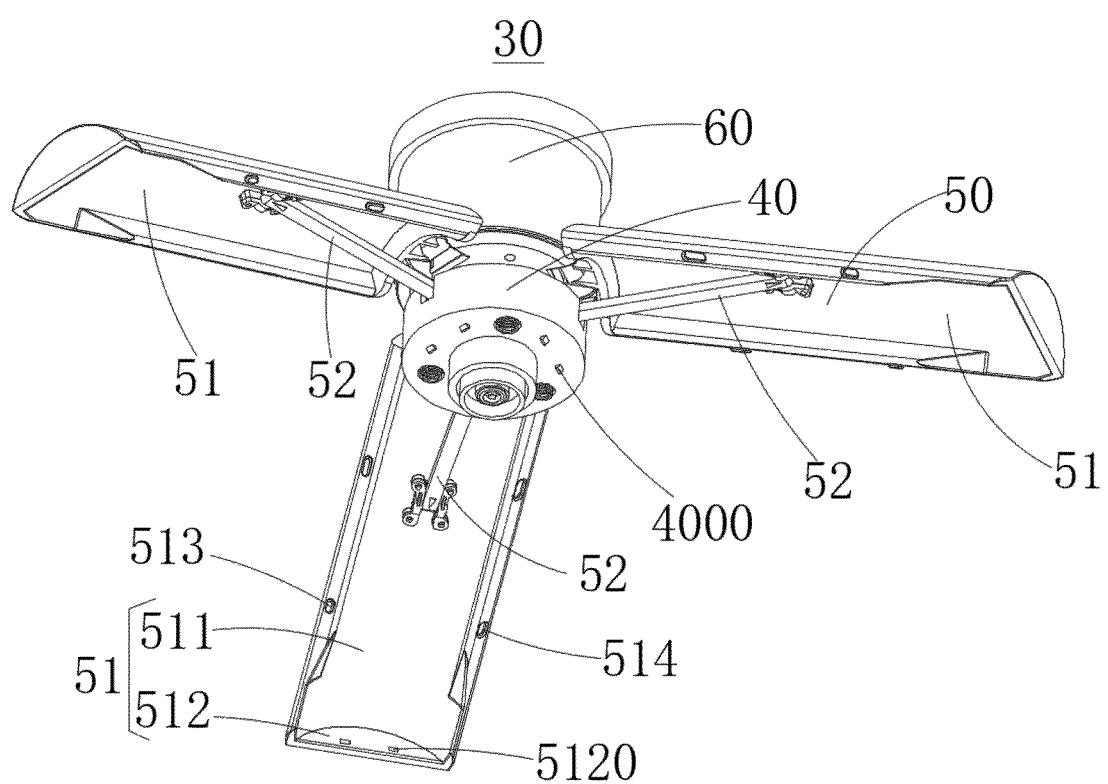
FIG. 7 is a three-dimensional structural schematic diagram of the support module in a unfolded state, in one embodiment of the present application.

In view of this, in order to solve the above technical problems, the application provides a fan, please refer to FIG. 1 to FIG. 7 as well, FIG. 1 is a three-dimensional structural schematic diagram of a fan when the fan is a pedestal fan, in one embodiment of the present application. FIG. 2 is an explosion diagram of the pedestal fan shown in FIG. 1. FIG. 3 is an explosion diagram of an air outlet device of the pedestal fan shown in FIG. 2. FIG. 4 is a three-dimensional structural schematic diagram of the fan when the fan is a desk fan, in one embodiment of the present application. FIG. 5 is the explosion diagram of the desk fan shown in FIG. 4. FIG. 6 is a front view of the support module in a folded state, in one embodiment of the present application. FIG. 7 is a three-dimensional structural schematic diagram of the support module in a unfolded state, in one embodiment of the present application.

The fan 1 provided in the present embodiments comprises a base module 10 and an air outlet device 20a. The base module 10 is used to be supported on a supporting surface, such as the ground, and the air outlet device 20a is detachably connected to the base module 10. The air outlet device 20a includes an air outlet module 20 and a support module 30 connected with each other, and the air outlet module 20 is used to blow air outward. The support module 30 has an unfolded state and a folded state. The support module 30 includes a linkage assembly 40 and multiple support assemblies 50. The multiple support assemblies 50 are arranged along the circumferential direction of the linkage assembly 40 and are all connected to the linkage assembly 40. When the support module 30 is in the folded state, at least part of the linkage assembly 40 protrudes from multiple support assemblies 50 along a direction away from the air outlet module 20.

Therein, when the air outlet device 20a is connected to the base module 10, the support module 30 is in the folded state and at least part of the support module 30 is located inside the base module 10, and at least part of the air outlet module 20 is located outside the base module 10. When the air outlet device 20a is disassembled and separated from the base module 10, when the linkage assembly 40 is subjected to a force along the direction toward the air outlet module 20, the linkage assembly 40 moves along the direction close to the air outlet module 20 and drives multiple support assemblies 50 to rotate synchronously along directions far from each other, thus making the support module in the unfolded state and enabling the multiple support assemblies 50 to be supported on the supporting surface use for supporting, such as the ground.

The fan 1 is a device capable of blowing air and can be applied in various scenarios such as indoors, outdoors, etc. It can improve the temperature of the external environment and enhance the overall comfortableness of users, that is, the temperature of the external environment can be adjusted to a comfortable range by the fan, and the overall comfortableness of users can be enhanced. The fan 1 provided in the present embodiment includes the base module 10 and the air outlet device 20a. The base module 10 is a component to be placed on the ground and the base module 10 has a certain height and can equip with the air outlet device 20a. The air outlet device 20a is detachably connected to the base module 10. When the air outlet device 20a is installed and connected to the base module 10, at this time, the fan 1 can be called as a pedestal fan, which also can be called as a vertical fan or a floor-standing fan. When the air outlet device 20a is disassembled and separated from the base module 10, the air outlet device 20a can be placed independently on the supporting surface, at this time, the air outlet device 20a can be called as a desk fan. Alternatively, the supporting surface includes but is not limited to the ground, desktop, etc. This embodiments of present application takes the supporting surface as the desktop as an example for illustration.

Therefore, the fan 1 provided in the embodiments of present application can be converted between the desk fan and the pedestal fan thus to achieve two uses. Users only need to purchase one air outlet device 20a and one base module 10, when they want a desk fan, they only need the air outlet device 20a; when they want a pedestal fan, they can install the air outlet device 20a on the base module 10, which can reduce space occupation and save costs.

As described above, the air outlet device 20a includes the air outlet module 20 and the support module 30, the air outlet module 20 is used to blow air to the outside. Based on the air outlet principle, the air outlet modules 20 include but are not limited to circulating air type air outlet modules 20, inertial flow air type air outlet modules 20, centrifugal air type air outlet modules 20, axial flow air type air outlet modules 20, etc. Alternatively, the air outlet module 20 can blow cold air or hot air to the outside, at the same time, the air outlet module 20 can also spray water mist outward and the water mist can be carried by the air or wind to float towards the external environment.

The support module 30 is mainly used to support the air outlet module 20 on the supporting surface when the air outlet device 20a is separated from the base module 10 and used as the desk fan independently. The support module 30 and the air outlet module 20 can be fixedly connected or detachably connected with each other. The embodiments of present application take the support module 30 and the air outlet module 20 are fixedly connected with each other as examples for illustration. The support module 30 has the unfolded state and the folded state. In the folded state, the support module 30 can be installed on the base module 10 with the air outlet module 20, thus to facilitate the support module 30 to be installed in the base module 10. At this point, at least part of the support module 30 is located inside the base module 10, and at least part of the air outlet module 20 is located outside the base module 10 and connected to the base module 10. When the air outlet device 20a is separated from the base module 10 for individual use, the support module 30 in the unfolded state can support the air outlet device 20a on the supporting surface.

The support module 30 includes of a linkage assembly 40 and multiple support assemblies 50. The multiple support assemblies 50 are arranged along the circumferential direction of the linkage assembly 40, that is, the multiple support assemblies 50 are arranged in a circle with 360°. When the multiple support assemblies 50 are mutually extended, the support module 30 is in the unfolded state, at this time, the multiple support assemblies 50 can be simultaneously supported on the supporting surface, thus to improve the support stability of the air outlet device 20a. When the multiple support assemblies 50 are combined with each other, the support module 30 is in the folded state, at this time, the volume of the support module 30 can be reduced, and it is convenient to place the support module 30 within the base module 10.

The linkage assembly 40 can be connected to multiple support assemblies 50 simultaneously, therefore, when the linkage assembly 40 moves, it can drive the multiple support assemblies 50 to move at the same time. Thus, there is no need to control each support assemblies 50 to move and fold one by one individually, which can reduce the operational difficulty for users. And in the embodiments of the present application, when the support module 30 is in a folded state, at least part of the linkage assembly 40 protrudes from multiple support assemblies 50 along the direction away from the air outlet module 20, that is, at least part of the linkage assembly 40 protrudes downward from the support assembly 50. When the support module 30 is in the folded state, the linkage assembly 40 will first come into contact with the supporting surface.

Based on the above structure, when the air outlet device 20a is connected to the base module 10, the support module 30 is in the folded state and at least part of the support module 30 is located inside the base module 10, at least part of the air outlet module 20 is located outside the base module 10, and the support module 30 is hidden inside the base module 10. When the air outlet device 20a is disassembled and separated from the base module 10, the support module 30 of the air outlet device 20a is still in the folded state, at this time, the part of the linkage assembly 40 of the support module 30 that protrudes from the multiple support assemblies 50 can first touch various surfaces and objects, such as hands, tables, floors, etc. When the linkage assembly 40 is subjected to a force along the direction toward the air outlet module 20 in various ways, for instance, when the user's hand pushes the linkage assembly 40 upwards, or when the support module 30 is against the supporting surface, and the user presses the air outlet device 20a downwards, at this time, the supporting surface will apply a force to the linkage assembly 40 along the direction toward the air outlet module 20. This embodiment and the following text take the linkage assembly 40 is pressed against the supporting surface as examples for illustration. From the above content, it can be known that since the lower end of the linkage assembly 40 is more protruding, the linkage assembly 40 will press against the supporting surface firstly. Subsequently, a force can be applied to the air outlet device 20a and the linkage assembly 40 along the direction toward to the supporting surface. That is, when a downward force/pressure is applied, the linkage assembly 40 can move upward relative to the air outlet module 20 along the direction close to the air outlet module 20. When the linkage assembly 40 moves upward, it can drive multiple support assemblies 50 to rotate synchronously along the directions far from each other, thereby making the support module 30 in the unfolded state, and multiple support assemblies 50 are supported on the supporting surface. Therefore, it is only need to place the air outlet device 20a on the supporting surface and press air outlet device 20a down to achieve unfolding the support module 30. There is no need to control the linkage assembly 40 additionally, which can further reduce the operation difficulty for users.

It is worth to be noted that, in this embodiment, at the beginning, the linkage assembly 40 is in contact with the supporting surface. As the linkage assembly 40 moves upward and the multiple support assemblies 50 extends, the multiple support assemblies 50 can also be supported on the supporting surface. During such process, the linkage assembly 40 can always remain in contact with the supporting surface when the air outlet device 20a is pressed downward, and the linkage assembly 40 can be considered as moves upward relative to the air outlet module 20. Or, during such process, after the linkage assembly 40 moves to the preset height when the linkage assembly 40 is pushed upwards by the hands of the user, only the multiple support assemblies 50 are supported on the supporting surface, and the linkage assembly 40 is spaced from the supporting surface.

When the support assemblies 50 needs to be folded, the linkage assembly 40 can be moved downward in the direction away from the air outlet module 20, that is, the linkage assembly 40 moves downward relative to the air outlet module 20, thereby causing the all of multiple support assemblies 50 to be combined and retracted, namely to be folded, or causing one or a small number of support assemblies 50 to be combined and retracted separately, thereby driving the linkage assembly 40 to move downward in the direction away from the air outlet module 20, then the other multiple support assemblies 50 can be driven to be combined and retracted by the linkage assembly 40. Therefore, no matter unfolding or folding, there is no need to control the multiple support assemblies 50 to move one by one individually, it is only need to move the linkage assembly 40 to achieve the unfolding and folding of multiple support assemblies 50.

In summary, based on the realization of the dual-purpose fan 1 including desk fan and pedestal fan, the embodiments of present application does not require multiple support assemblies 50 to rotate in sequence during the unfolding and folding of the support assemblies 50. Through the cooperation of the linkage assembly 40, only the movement of the linkage assembly 40 needs to be controlled, and the multiple support assemblies 50 can be driven to fold or unfold synchronously by the linkage assembly 40, reducing the operational difficulty for users.

It is worth to be noted that, the air outlet device 20a can function as the smallest selling unit, that is, the air outlet device 20a can be an individual product and can be sold individually. Therefore, the air outlet device 20a can be used as a protected object individually. At this time, the present embodiment can provide an air outlet device 20a individually, the air outlet device 20a includes the air outlet module 20 and the support module 30 connected with each other. The air outlet module 20 is used for blowing air outward. The support module 30 has an unfolded state and a folded states. The support module 30 includes a linkage assembly 40 and multiple support assemblies 50. The multiple support assemblies 50 are arranged along the circumferential direction of the linkage assembly 40 and are all connected to the linkage assembly 40. When the support module 30 is in the folded state, at least part of the linkage assembly 40 protrudes from multiple support assemblies 50 along a direction away from the air outlet module 20. When the linkage assembly 40 is subjected to a force along the direction toward the air outlet module 20, the linkage assembly 40 moves along the direction close to the air outlet module 20 and drives multiple support assemblies 50 to rotate synchronously along directions far from each other, thus making the support module in the unfolded state and enabling the multiple support assemblies 50 to be supported on the supporting surface.

Subsequently, the present embodiments of present application may also provide a fan 1 including the air outlet device 20*a* and the base module 10. The fan 1 provided in the present embodiment includes the base module 10 and the air outlet device 20*a* provided by the above-mentioned embodiments of the present application. The base module 10 is used to be supported on the supporting surface, such as the ground, and the air outlet device 20*a* is detachably connected to the base module 10. When the air outlet device 20*a* is connected to the base module 10, the support module 30 is in the folded state and at least part of the support module 30 is located inside the base module 10, and at least part of the air outlet module 20 is located outside the base module 10.

Please refer to FIGS. 6-7 again, in this embodiment, the support module 30 also includes a shell assembly 60 connected to the air outlet module 20. The linkage assembly 40 is arranged on the side of the shell assembly 60 that is away from the air outlet module 20. Each support assembly 50 includes a support member 51 and a connecting member 52. The support member 51 is rotatably connected to the shell assembly 60. A first end of the connecting member 52 is rotatably connected the support member 51, and a second end of the connecting member 52 is rotatably connected the linkage assembly 40.

Therein, during the process of unfolding the support module 30, the linkage assembly 40 moves along the direction close to the shell assembly 60, the second end of the connecting member 52 rotates relative to the linkage assembly 40, the first end of the connecting member 52 rotates relative to the support member 51, and the support member 51 rotates relative to the shell assembly 60. This enables the support member 51 to rotate in a direction away from the linkage assembly 40.

During the process of folding the support module 30, the linkage assembly 40 moves in a direction away from the shell assembly 60, the second end of the connecting member 52 rotates relative to the linkage assembly 40 in the opposite direction, the first end of the connecting member 52 rotates relative to the support member 51 in the opposite direction, and the support member 51 rotates relative to the shell assembly 60 in the opposite direction. Namely, the direction the second end of the connecting member 52 rotates during the process of folding the support module 30 is opposite to the direction the second end of the connecting member 52 rotates during the process of unfolding the support module 30, and the direction the first end of the connecting member 52 rotates during the process of folding the support module 30 is opposite to the direction the first end of the connecting member 52 rotates during the process of unfolding the support module 30, and the direction the support member 51 rotates during the process of folding the support module 30 is opposite to the direction the support member 51 rotates during the process of unfolding the support module 30. This enables the support member 51 to rotate in the direction close to the linkage assembly 40.

That is, in addition to the above-mentioned components, the support module 30 further includes the shell assembly 60, the shell assembly 60 is connected to the air outlet module 20, and some components of the air outlet module 20 can also be arranged inside the shell assembly 60. The linkage assembly 40 is located on the side of the shell assembly 60 that is away from the air outlet module 20, that is, the linkage assembly 40 is located below the shell assembly 60. Each support assembly 50 includes the support member 51 and the connecting member 52. Therein, the support member 51 is mainly used to be supported on the supporting surface when the support module 30 is in the unfolded state, thereby playing a supporting role. The support member 51 is rotatably connected to the shell assembly 60. The connecting member 52 mainly serves to connect the support member 51 and the linkage assembly 40. For instance, the first end of the connecting member 52 is rotatably connected the support member 51, and the second end is rotatably connected the linkage assembly 40. In the embodiments of the present application, due to the support members 51 are mainly used to be supported on the supporting surface and play the supporting role when the support module 30 is in the unfolded state, the support module 30 is in the unfolded state or the folded state also can be called as the multiple support assemblies 50 or the support members 51 are in the unfolded state or in the folded state.

Through the above settings, during the process of unfolding the support module 30, when a downward pressure is applied to the air outlet device 20*a*, the linkage assembly 40 moves upward along the direction close to the shell assembly 60. The second end of the connecting member 52 rotates relative to the linkage assembly 40, and the first end of the connecting member 52 rotates relative to the support assembly 51, thus causing the support member 51 to rotate relative to the shell assembly 60. This enables the support member 51 to rotate and extend outward in the direction away from the linkage assembly 40. During the process of folding the support module 30, the linkage assembly 40 can be pulled down to move it downward in the direction away from the shell assembly 60. The second end of the connecting member 52 rotates relative to the linkage assembly 40 in the opposite direction, and second end of the connecting member 52 rotates relative to the support member 51 in the opposite direction, thus causing the support member 51 to rotate relative to the shell assembly 60 in the opposite direction. This enables the support member 51 to rotate inward and retract along the direction close to the linkage assembly 40.

In summary, through the mutual cooperation of the linkage assembly 40, the support member 51, and the connecting member 52, the structure is simple and the unfolding and folding of the support member 51 can be achieved.

Alternatively, a button 53 may be provided at one of the support members 51, when the air outlet device 20*a* is installed on the base module 10, the air outlet device 20*a* can be locked via the button 53. When it is need to take out the air outlet device 20*a*, the air outlet device 20*a* can be unlocked via pressing the button 53 and then can be taken out.

Figure 8:
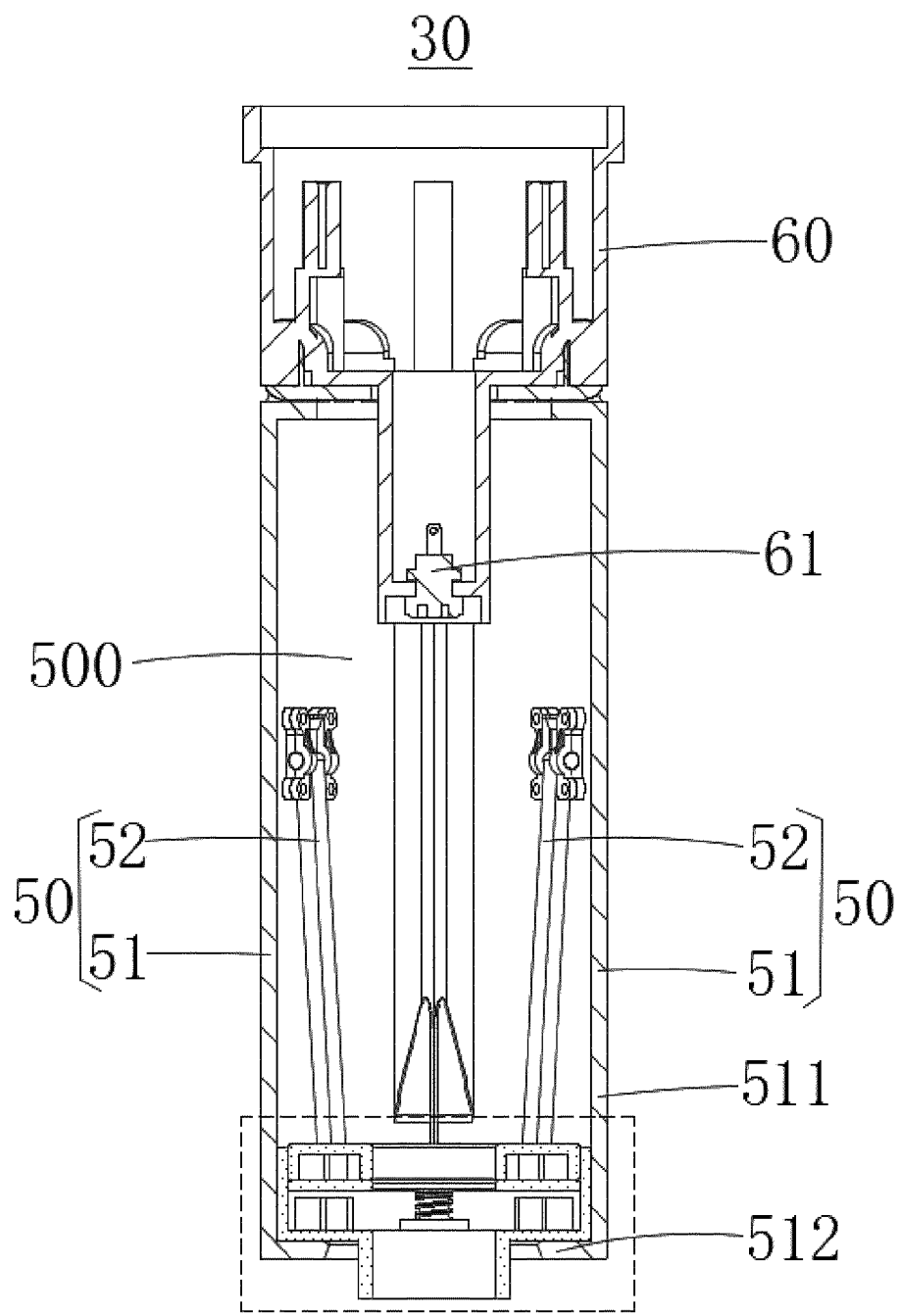
FIG. 8 is a cross-sectional schematic diagram of the support module shown in FIG. 6.

Please also refer to FIGS. 7 to 8. FIG. 8 is a cross-sectional schematic diagram of the support module shown in FIG. 6. In this embodiment, the support member 51 includes a side wall 511 and a bottom wall 512 that is bent connected to the side wall 511. The side wall 511 is rotatably connected to the shell assembly 60 and the first end of the connecting member 52. The side of the linkage assembly 40 away from the shell assembly 60 is provided with a first snap-on part 4000, and the bottom wall 512 is provided with a second snap-on part 5120.

Therein, when the support module 30 is in the folded state, the bottom wall 512 is arranged on the side of the linkage assembly 40 that is away from the shell assembly 60, and the first snap-on part 4000 and the second snap-on part 5120 cooperate with each other, thereby enabling the support member 51 to connect the linkage assembly 40 via a snap-on mode.

In some embodiments, the support member 51 is composed of the side wall 511 and the bottom wall 512, the bottom wall 512 is bent connected the side wall 511, so the support member 51 is in an L shape. The side wall 511 can be rotatably connected to the shell assembly 60 and the first end of the connecting member 52. The first snap-on part 4000 is provided at the side of the linkage assembly 40 that is away from the shell assembly 60, namely, below the linkage assembly 40, and the second snap-on part 5120 is provided at the bottom wall 512 correspondingly.

When the support module 30 is in the folded state, the side walls 511 of the multiple support members 51 can be arranged in a circle. At this time, the bottom wall 512 is located at the side of the linkage assembly 40 that is away from the shell assembly 60, that is, the bottom wall 512 is set below the linkage assembly 40. Therefore, by making the first snap-on part 4000 and the second snap-on part 5120 cooperate with each other, the support part 51 can be connected to the linkage assembly 40, thereby enhancing the stability of the support part 51 in the folded state and preventing it from moving randomly. The first snap-on part 4000 includes one of the snap-on and the slot, and the second snap-on part 5120 includes the other one of the snap-on and the slot. This embodiment only takes the first snap-on part 4000 as the snap-on and the second snap-on part 5120 as the slot as an example for illustration.

In conclusion, by designing the support assembly 51 in an L shape, when the support module 30 is in the folded state, the bottom wall 512 can be connected to the linkage assembly 40 by snap-on mode, thereby enhancing the stability of the support assembly 51.

Alternatively, one side of the side wall 511 of the support member 51 is provided with a first limit part 513, and the other side of the side wall 511 is provided with a second limit part 514. When the support module 30 is in the folded state, the first limit part 513 of each of the multiple support members 51 arranged in a circular pattern works in coordination with the second limit part 514 of the adjacent support member 51, which can further restrict the rotation of the support members 51 and further enhance the stability. The first limit part 513 includes one of a limit block and a limit hole, and the second limit part 514 includes the other one of the limit block and the limit hole.

Figure 9:
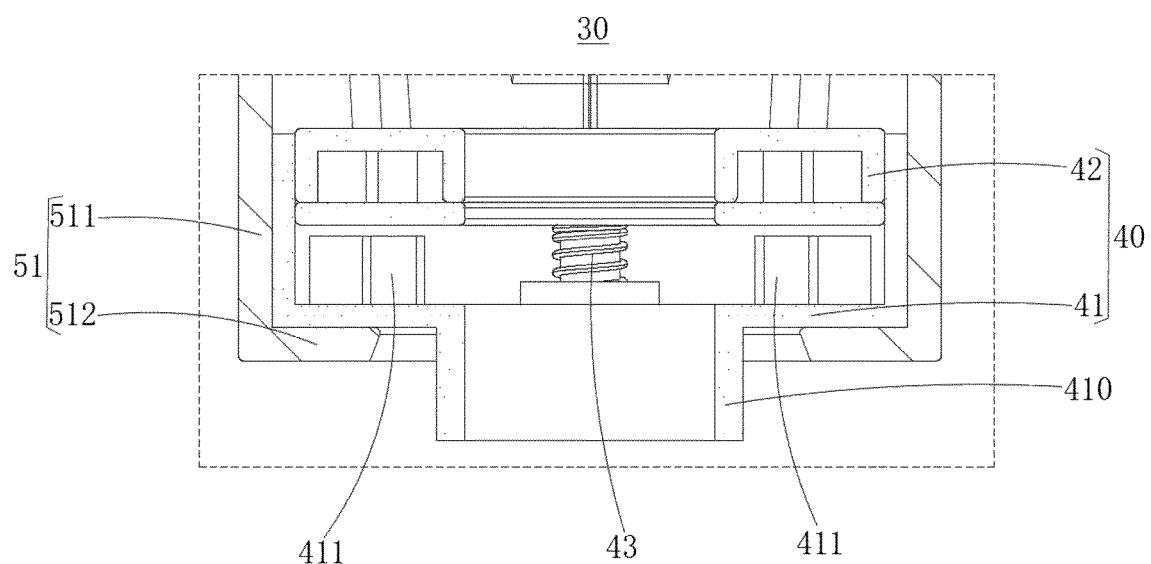
FIG. 9 is a magnified view of the support module shown in FIG. 8.

Please refer to FIG. 9, which is a magnified view of the support module 30 shown in FIG. 8. In this embodiment, the linkage assembly 40 includes a bottom shell 41 and an end cover 42 installed on the bottom shell 41. The bottom shell 41 is provided with a first snap-on part 4000, and the end cover 42 is rotatably connected to the second end of the connecting member 52. The bottom shell 41 can move relative to the end cover 42 along the axial direction of the bottom shell 41, and when the support module 30 is in the folded state, the bottom shell 41 can be pressed against the supporting surface.

Therein, during the process of unfolding the support module 30, when the pressure is applied to the bottom shell 41 along the direction toward the supporting surface, the bottom shell 41 moves relative to the end cover 42 along the direction close to the shell assembly 60, thus causing the first snap-on part 4000 to be separated from the second snap-on part 5120, and the bottom shell 41 can also drive the end cover 42 to move along the direction close to the shell assembly 60, thus enabling multiple support assemblies 50 to rotate synchronously in directions that are far from each other.

That is, in some embodiments, the linkage assembly 40 is composed of the bottom shell 41 located at the bottom and the end cover 42 located at the top. The first snap-on part 4000 mentioned above is provided at the bottom shell 41, and the end cover 42 is provided at the opening above the bottom shell 41. The end cover 42 is rotatably connected to the second end of the connecting member 52. Moreover, the bottom shell 41 and the end cover 42 are not fixedly connected with each other, the bottom shell 41 and the end cover 42 are movably connected with each other, and the bottom shell 41 can move relative to the end cover 42 along the axial direction of the bottom shell 41. When the support module 30 is in the folded state, the bottom shell 41 is in contact with the supporting surface. Alternatively, a contact part 410 is protruded on the side of the bottom shell 41 that is away from the air outlet module 20, the contact part 410 protrudes from the support member 51, so that the contact part 410 protruded can be contacted to the supporting surface.

Based on the above structure, during the process of unfolding the support module 30, when the air outlet device 20a is pressed down, that is, when a downward pressure is applied to the air outlet device 20a/bottom shell 41 along the direction toward the supporting surface, the supporting surface applies an upward reaction force to the bottom shell 41, thereby causing the bottom shell 41 to move upward along the direction close to the shell assembly 60 relative to the end cover 42. Namely, the shell assembly 60 and the end cover 42 are pressed down, and it can be considered as the bottom shell 41 moves upward along the direction close to the shell assembly 60 relative to the end cover 42. Therein, when the bottom shell 41 moves upward, the first snap-on part 4000 can be separated from the second snap-on part 5120, at this time, the snap-on state can be released, and the support member 51 can rotate. Moreover, the bottom shell 41 can also drive the end cover 42 to move along the direction close to the shell assembly 60, thus, as mentioned before, the second end of the connecting member 52 rotates relative to the end cover 42, the first end of the connecting member 52 rotates relative to the support member 51, and the support member 51 rotates relative to the shell assembly 60, thereby enabling the multiple support members 51/multiple support assemblies 50 to rotate synchronously in directions far from each other.

In summary, by enabling the bottom shell 41 to move relative to the end cover 42, during the unfolding process, the first snap-on part 4000 and the second snap-on part 5120 can be separated first, and then the support part 51 can be rotated, which does not need to unlock by manual operations, the operational difficulty is further reduced.

In this embodiment, a top contact part 411 is provided inside the bottom shell 41, and there is a distance between the top contact part 411 and the end cover 42. When the pressure is applied to the bottom shell 41 along the direction toward the supporting surface, the bottom shell moves relative to the end cover along the direction close to the shell assembly, when the bottom shell 41 moves a first distance relative to the end cover 42 along the direction close to the shell assembly 60, the first snap-on part 4000 separates from the second snap-on part 5120. When the bottom shell 41 moves a second distance relative to the end cover 42 along the direction close to the shell assembly 60, the bottom shell 41 contacts to the top contact part 411 against the end cover 42, thereby enabling the bottom shell 41 to drive the end cover 42 to move together. Therein, the first distance is less than the second distance.

The top contact part 411 is set inside the bottom shell 41 and is protruded towards the end cover 42, when the bottom shell 41 is not subjected to the rebound force of the supporting surface, there is the distance between the top contact part 411 and the end cover 42. When pressure is applied to the bottom shell 41 along the direction toward the supporting surface, due to there is the distance between the top contact part 411 and the end cover 42, the bottom shell 41 will first move upward relative to the end cover 42 along the direction close to the shell assembly 60. When the bottom shell 41 moves the first distance, as mentioned above, the first snap-on part 4000 separates from the second snap-on part 5120, thus release the locking state of support member 51. When the bottom shell 41 continues to move upward and reaches the second distance larger than the first distance, at this time, the top contact part 411 contacts with the end cover 42, therefore, when the bottom shell 41 moves upward subsequently, it can also drive the end cover 42 to move upward, thereby enabling the bottom shell 41 to drive the end cover 42 to move, and then the end cover 42 can unfold the support members 51.

Figure 10:
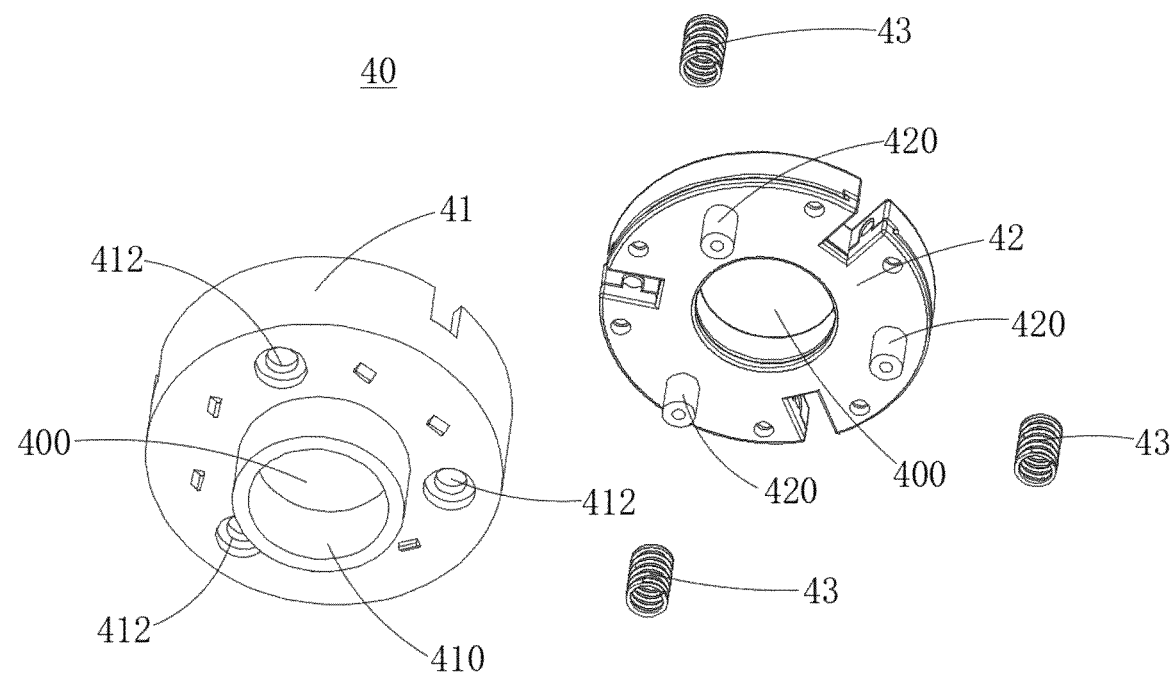
FIG. 10 is an explosion diagram of a bottom shell and the end cover in one embodiment of the present application.

Please also refer to FIGS. 9 to 10, FIG. 10 is an explosion diagram of a bottom shell and the end cover in one embodiment of the present application. In this embodiment, the linkage assembly 40 further includes an elastic member 43 arranged in the bottom shell 41. The end cover 42 is provided with a guiding part 420. The elastic member 43 is sleeved on the guiding part 420 and two opposite ends of the elastic member 43 are respectively connected to the end cover 42 and the bottom shell 41. The bottom shell 41 is provided with a through hole 412 corresponding to the guiding part 420.

Therein, when the bottom shell 41 moves relative to the end cover 42 along the direction close to the shell assembly 60, the elastic member 43 is in a compressed state, and the guiding part 420 protrudes from the bottom shell 41 through the through hole 412. When the bottom shell 41 is separated from the supporting surface, the elastic element 43 in the compressed state can drive the bottom shell 41 to move in a direction away from the shell assembly 60.

That is, the linkage assembly 40 may further include the elastic member 43, the elastic member 43 can be set inside the bottom shell 41, and one end of the elastic member 43 is connected to the end cover 42, while the other end is connected to the bottom shell 41. When the bottom shell 41 moves upward along the direction close to the shell assembly 60 relative to the end cover 42, the elastic member 43 is compressed, thus making the elastic member 43 in the compressed state. When the air outlet device 20a is lifted to separate the bottom shell 41 from the supporting surface, or when the bottom shell 41 moves upward to be separated from the supporting surface and only the support members 51 are supported on the supporting surface, the elastic member 43 in the compressed state can drive the bottom shell 41 to move downward in a direction away from the shell assembly 60, thus bringing the bottom shell 41 back to its initial position.

Moreover, the guiding part 420 is set inside the end cover 42, the elastic member 43 can be sleeved on the guiding part 420, thus the guiding part 420 provides an installation foundation for the elastic member 43, and the bottom shell 41 is provided with the through hole 412 for the guiding part 420 correspondingly. When the bottom shell 41 moves upward along the direction close to the shell assembly 60 relative to the end cover 42, the guiding part 420 can protrude from the bottom shell 41 through the through hole 412, thereby using the guiding part 420 to provide guidance for the movement of the bottom shell 41.

Figure 11:
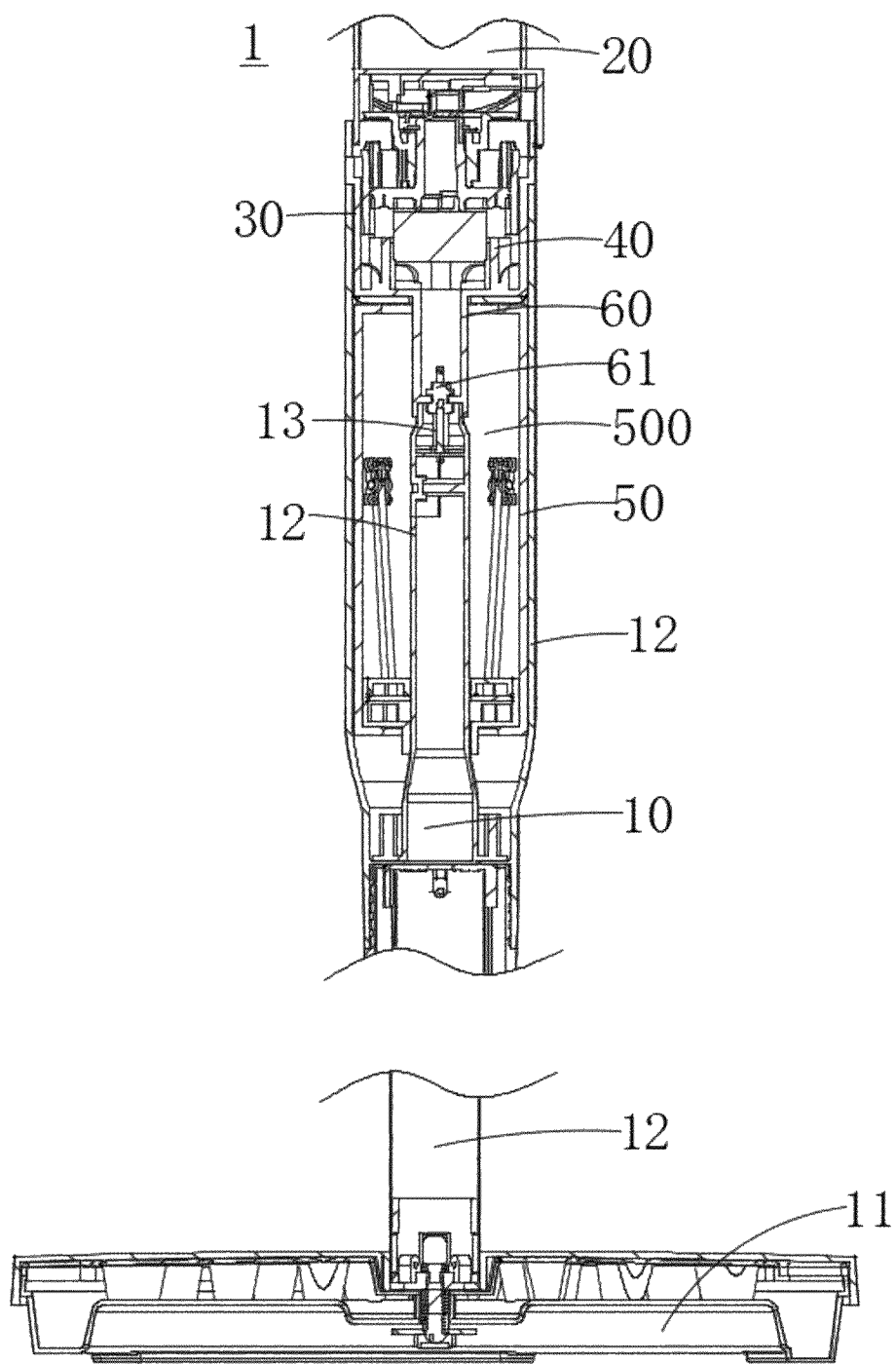
FIG. 11 is a partial cross-sectional schematic diagram of the pedestal fan shown in FIG. 1.

Please also refer to FIGS. 8, 10 and 11, FIG. 11 is a partial cross-sectional schematic diagram of the pedestal fan shown in FIG. 1. In this embodiment, the support module 30 further includes a shell assembly 60 connected to the air outlet module 20. The linkage assembly 40 is located on the side of the shell assembly 60 that is away from the air outlet module 20. The air outlet module 20 includes a first electrical connection terminal 61 located within the shell assembly 60. The linkage assembly 40 has a through hole 400. When the support module 30 is in a folded state, a containment space of 500 is formed by the multiple support assemblies 50 which are enclosed together. The base module 10 includes a base 11, a support rod 12, and a second electrical connection terminal 13. The base 11 is used to be supported on the supporting surface such as the ground, the support rod 12 is set on the base 11, and the second electrical connection terminal 13 is set inside the support rod 12.

Therein, when the air outlet device 20a is connected to the base module 10, the end of the support rod 12 passes through the linkage assembly 40 through the through hole 400, and the first electrical connection terminal 61 is connected to the second electrical connection terminal 13 within the containment space 500.

The air outlet module 20 is provided with a first electrical connection terminal 61 located inside the shell assembly 60. The first electrical connection terminal 61 is plugged into an external power source to obtain electrical energy from the external power source and then provides the electrical energy to the air outlet module 20. This embodiment can provide a through hole 400 on the linkage assembly 40 along the axial direction of the the linkage assembly 40, that is, the through hole 400 can be provided at the end cover 42 and the bottom shell 41, thus to provide a basis for the support rod 12 and the shell assembly 60 to pass through the linkage assembly 40.

When the support assemblies 50 are in the folded state, the multiple support assemblies 50 are arranged to form the containment space 500. The base module 10 includes the base 11, the support rod 12, and the second electrical connection terminal 13. The base 11 is circular and supported on the ground, and the rod-shaped support rod 12 is set on the base 11 to provide a certain height for the air outlet device 20a, thus the fan 1 is possible to become the pedestal fan.

This embodiment may add the second electrical connection terminal 13 within the support rod 12. When the support assemblies 50 are in the folded state and is installed together with the air outlet module 20 on the base module 10, the support module 30 is set within the support rod 12 of the base module 10. At this time, the end of the support rod 12 passes through the linkage assembly 40 through the through hole 400. And the first electrical connection terminal 61 and the second electrical connection terminal 13 are connected with each other within the containment space 500. In this way, the second electrical connection terminal 13 can be used to provide power to the air outlet module 20, without the need to use additional components to connect the first electrical connection terminal 61, thus simplifying the structure. Moreover, the second electrical connection terminal 13 is hided within the support rod 12, thus can also enhance the appearance performance of the fan 1.

Figure 12:
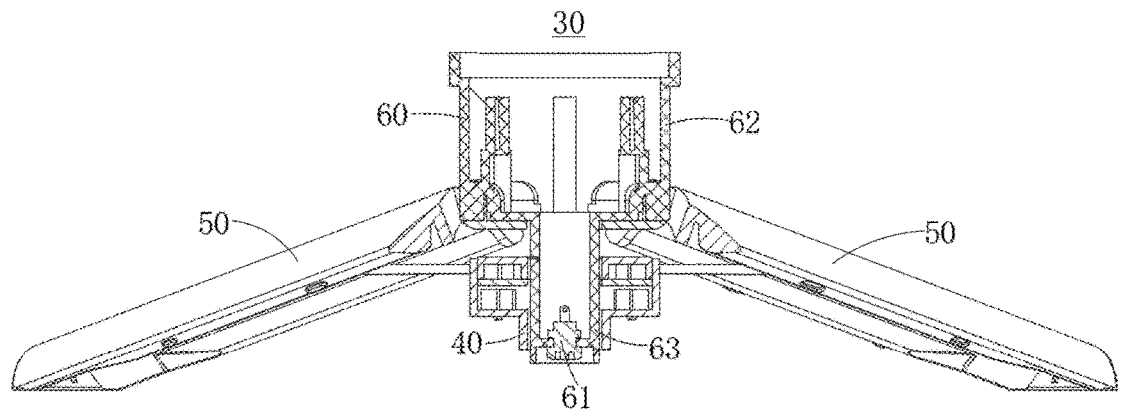
FIG. 12 is a cross-sectional schematic diagram of the support module shown in FIG. 7.

Please refer to FIG. 12, which is a cross-sectional schematic diagram of the support module shown in FIG. 7. In this embodiment, the shell assembly 60 includes a shell 62 and a protruding part 63 located on the side of the shell 62 away from the air outlet module 20, the first electrical connection terminal 61 is located within the protruding part 63. When the support module 30 is in the unfolded state, the end of the protruding part 63 and the first electrical connection terminal 61 protrude from the linkage assembly 40, and the first electrical connection terminal 61 is used to connect with a third electrical connection terminal.

In some embodiments, the shell assembly 60 is composed of the shell 62 and the protruding part 63 setting on the side of the shell 62 that is away from the air outlet module 20, that is, there is the protruding part 63 extending below the shell 62, therein, the first electrical connection terminal 61 can be set inside the protruding part 63. When the support module 30 is entering the unfolded state, the linkage assembly 40 will move upward towards the direction close to the shell assembly 60. When the linkage assembly 40 moves to cause the support module 30 to be the unfolded state, the protruding part 63 can pass through the linkage assembly 40 via the through hole 400, and the end of the protruding part 63 and the first electrical connection terminal 61 can protrude from the linkage assembly 40. In other words, the first electrical connection terminal 61 can be exposed. Thus, in the unfolded state, the third electrical connection terminal from the outside can be connected to the first electrical connection terminal 61. Thus, the air outlet module 20 can be provided power by utilizing the third electrical connection terminal.

Figure 13:
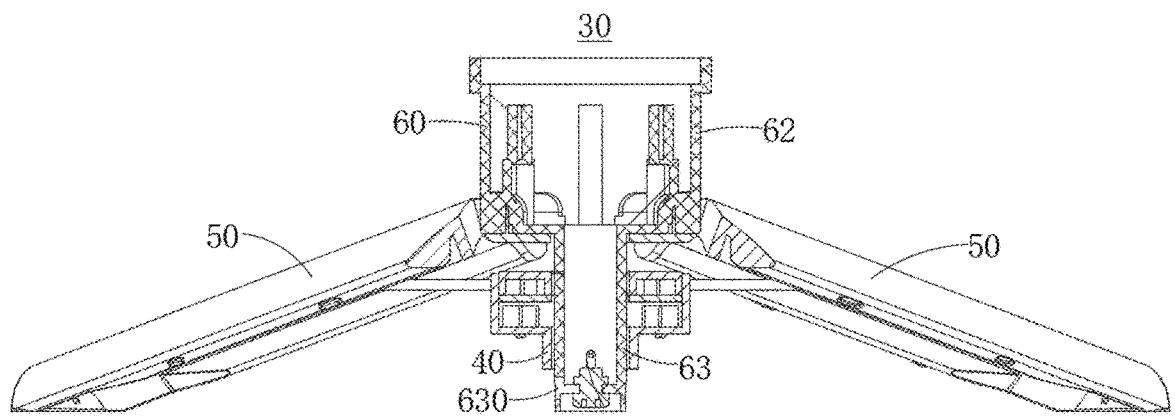
FIG. 13 is a cross-sectional schematic diagram of the support module in another embodiment of the present application.

Please refer to FIG. 13, which is a cross-sectional schematic diagram of the support module in another embodiment of the present application. In this embodiment, when the support module 30 is in the unfolded state, a surface of the protruding part 63 that is close to the supporting surface and surfaces of the multiple support assembles 50 that are close to the supporting surface are in one plane. A connection hole 630 is set on the side wall 511 of the protruding part 63 that is protruded from the linkage assembly 40. The third electrical connection terminal is connected to the first electrical connection terminal 61 through the connection hole 630.

When the support module 30 is in the unfolded state, since the end of the protruding part 63 can protrude from the linkage assembly 40, that is, the end of the protruding part 63 will be close to the supporting surface than the linkage assembly 40, the surface of the protruding part 63 close to the supporting surface can be set flush with the surfaces of multiple support assemblies 50 close to the supporting surface. In other words, the lower surface of the protruding part 63 and the lower surfaces of the supporting assemblies 50 are in the one plane in the unfolded state, and the supporting assemblies 50 and the protruding part 63 are used to be jointly supported on the supporting surface to enhance the supporting effect. Moreover, since the protruding part 63 is supported by the supporting surface, the linkage assembly 40 can be separated from the supporting surface, which is also conducive to the return of the bottom shell 41 to its initial state under the action of the elastic member 43 as mentioned above.

As the protruding part 63 is in contact with the supporting surface, it will block the opening/hole below the protruding part 63, thereby blocking the first electrical connection terminal 61. On this basis, the present embodiment may further provide a connection hole 630 on the side wall 511 of the protruding part 63 that protrudes from the linkage assembly 40, and the third electrical connection terminal is connected to the first electrical connection terminal 61 through the connection hole 630. In other words, the third electrical connection terminal is connected to the first electrical connection terminal 61 through the side wall 511 of the protruding part 63, thus reducing the connection difficulty between the first electrical connection terminal 61 and the third electrical connection terminal.

Figure 14:
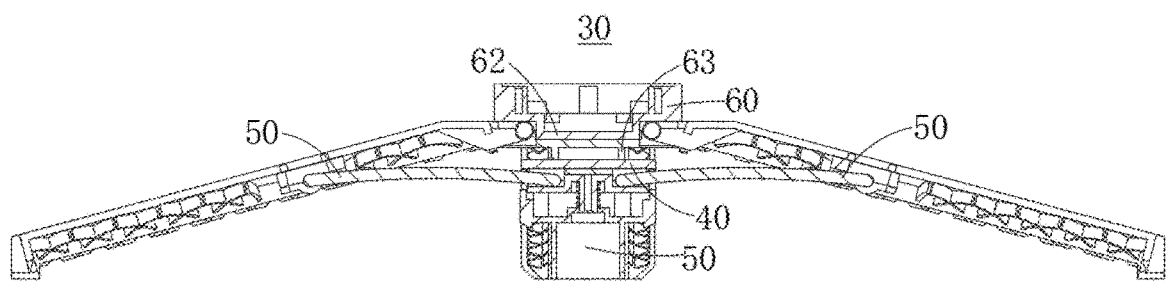
FIG. 14 is a cross-sectional schematic diagram of the support module in further another embodiment of the present application.

Please refer to FIG. 14, which is a cross-sectional schematic diagram of the support module in further another embodiment of the present application. In this embodiment, the support module 30 further includes a shell assembly 60 connected to the air outlet module 20. The linkage assembly 40 is located on the side of the shell assembly 60 that is away from the air outlet module 20. The shell assembly 60 includes the shell 62 and the protruding part 63 located on the shell 62 that is away from the air outlet module 20. When the support module 30 is in the unfolded state, the protruding part 63 contacts to the linkage assembly 40.

The positional relationship between the linkage assembly 40 and the shell assembly 60, as well as the shell 62 and the protruding part 63 in the shell assembly 60, have been detail introduced in the previous description. This embodiment will not to detail describe again. In this embodiment, the linkage assembly 40 does not have the through hole 400. Therefore, during the process of the support module 30 being unfolded, the linkage assembly 40 will move upward towards the direction close to the shell assembly 60. When the support module 30 is in the unfolded state, at this time, the protruding part 63 can touch the linkage assembly 40, thus preventing the linkage assembly 40 from further moving upward and stopping the movement.

Alternatively, the support assemblies 50 can be supported together with the linkage assembly 40 on the supporting surface, or only the support assemblies 50 can be supported on the supporting surface.

Alternatively, since the linkage assembly 40 does not have the through hole 400, in this embodiment, the first electrical connection terminal 61 is not set within the protruding part 63 but within the shell 62. A hole can be provided at the side wall 511 of the shell 62, no matter it is a desk fan or a pedestal fan, all other electrical connection terminals can be connected to the first electrical connection terminal 61 through the hole.

Figure 15:
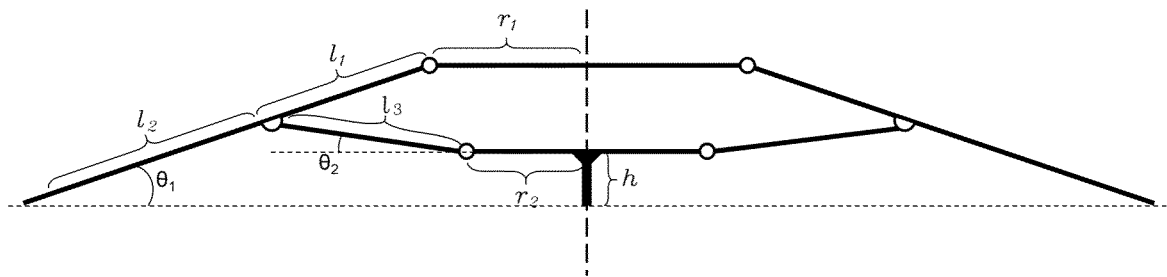
FIG. 15 is a schematic diagram of the support module in the unfolded state, in one embodiment of the present application.
Figure 16:
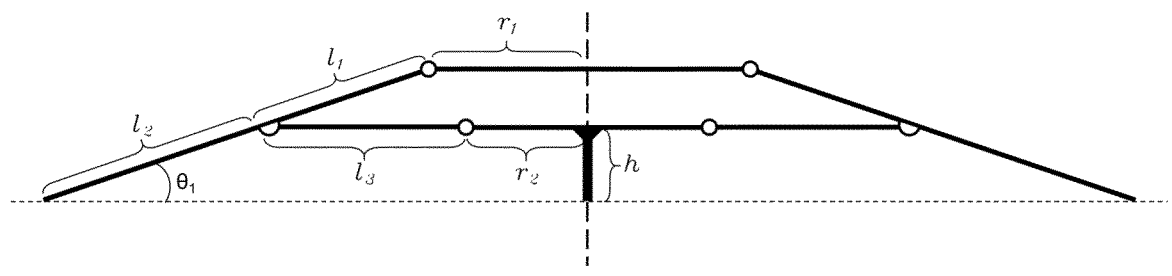
FIG. 16 is a schematic diagram of the support module in the unfolded state in another embodiment of the present application.
Figure 17:
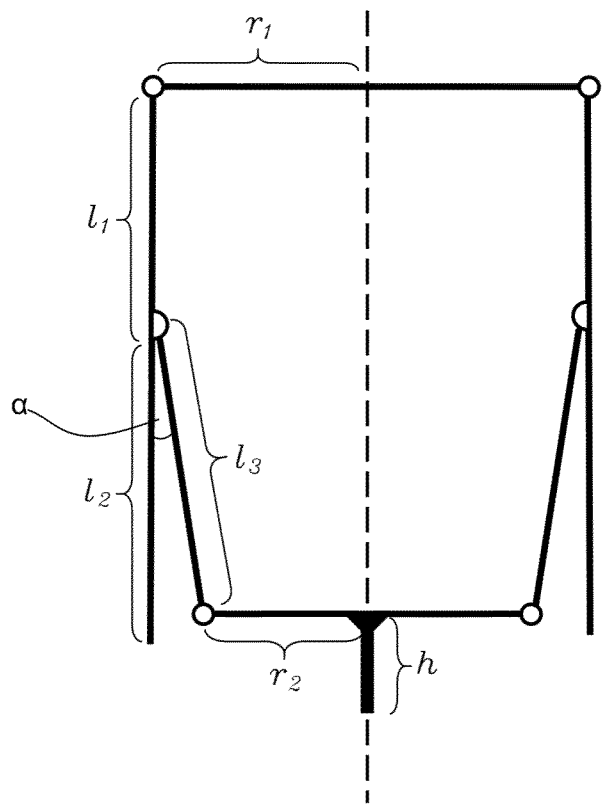
FIG. 17 is a schematic diagram of the support module in the folded state, in one embodiment of the present application.

The above application has detail introduced various specific structures of the fan. Next, the present application will continue to introduce the dimensional relationship between the linkage assembly and the support assembles in the support module. The following text simplifies each component/assembly in the support module into a straight link mechanism model, and the dimensions of each part are shown in the following figure. Please also refer to FIGS. 15 to 17. FIG. 15 is a schematic diagram of the support module in the unfolded state, in one embodiment of the present application. FIG. 16 is a schematic diagram of the support module in the unfolded state in another embodiment of the present application. FIG. 17 is a schematic diagram of the support module in the folded state, in one embodiment of the present application.

Among them, FIGS. 15 to 17 are the simplified schematic diagrams of the support module. Firstly, $r_1$ is a distance from the upper end of the support assembly to the central axis of the support module (as indicated by the vertical dotted line in FIGS. 15-17). $l_1$ is a distance from the upper end of the support member to a connection point between the support member and the connecting member. $l_2$ is a distance from the connection point between the support member and the connecting member to the lower end of the support member. $l_3$ is a length of the connecting member. $r_2$ is a distance from the connection point between the connecting member and the linkage assembly to the central axis of the supporting module. h is a distance that the linkage assembly protrudes downward. $\theta_1$ is an angle between the support member and the horizontal plane. $\theta_2$ is an angle between the connecting member and the horizontal plane. α is an angle between the connecting member and the support member when the support module is in the folded state.

As shown in FIG. 15, in the unfolded state, in order to ensure that support surfaces of the support members is flush with the bottom of the middle of the linkage assembly, namely, in order to ensure the surfaces of the support members that is close to the supporting surface and surface of the linkage assembly that are close to the supporting surface are in one plane, the dimensions of each structure should satisfy:

$$l_1 \cdot \cos\theta_1 + r_1 = l_3 \cdot \cos\theta_2 + r_2; \text{ and}$$

$$l_2 \cdot \sin\theta_1 = h + l_3 \cdot \sin\theta_2.$$

As shown in FIG. 16, specifically, if the connecting member is parallel to the supporting surface when the support module is in the unfolded state, the support member can reach the maximum opening angle and the minimum height, at this time, and the structure has the greatest stability. The dimensions of each structure should satisfy:

$$l_1 \cdot \cos\theta_1 + r_1 = l_3 + r_2;$$

and $$l_2 \cdot \sin\theta_1 = h.$$

As shown in FIG. 17, when in the unfolded state, the dimensions of each structure should satisfy:

$$l_3 \cdot \sin\alpha < l_2 < l_3 \cdot \sin\alpha + h;$$

and in order to ensure that the support members can be extended by pushing the linkage assembly when in the folded state, a should be greater than 0°.

Figure 18:
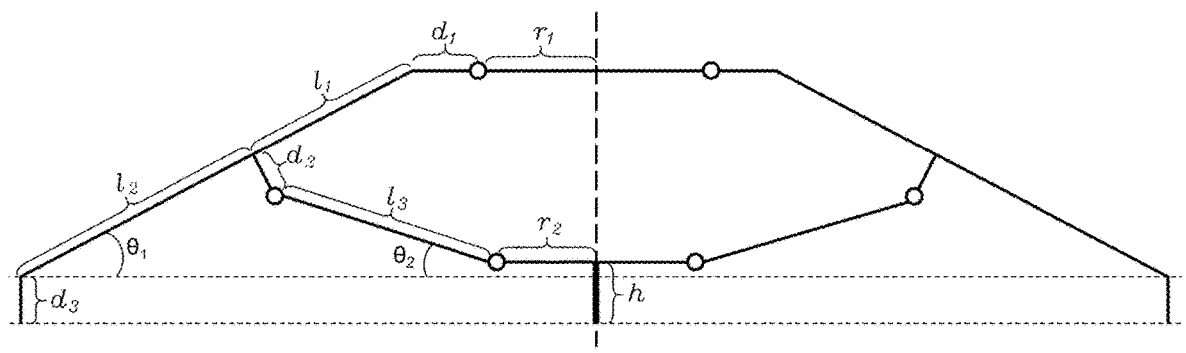
FIG. 18 is a schematic diagram of the support module in the unfolded state in another embodiment of the present application.
Figure 19:
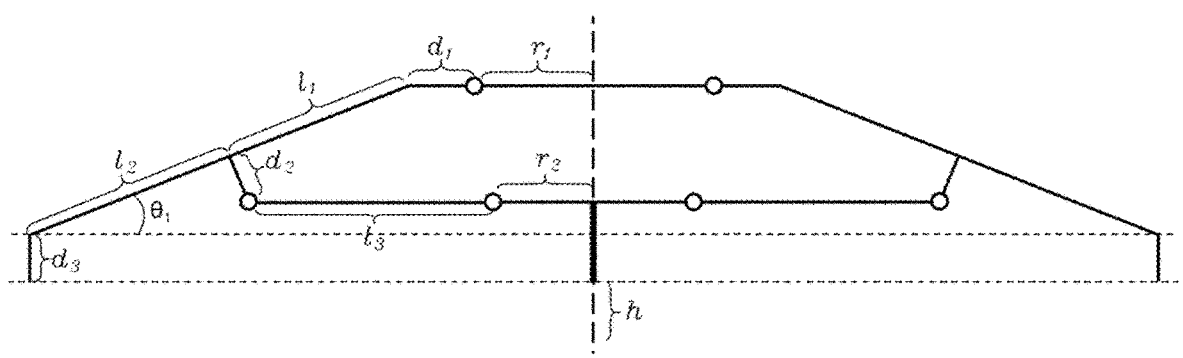
FIG. 19 is a schematic diagram of the support module in the unfolded state in further another embodiment of the present application.
Figure 20:
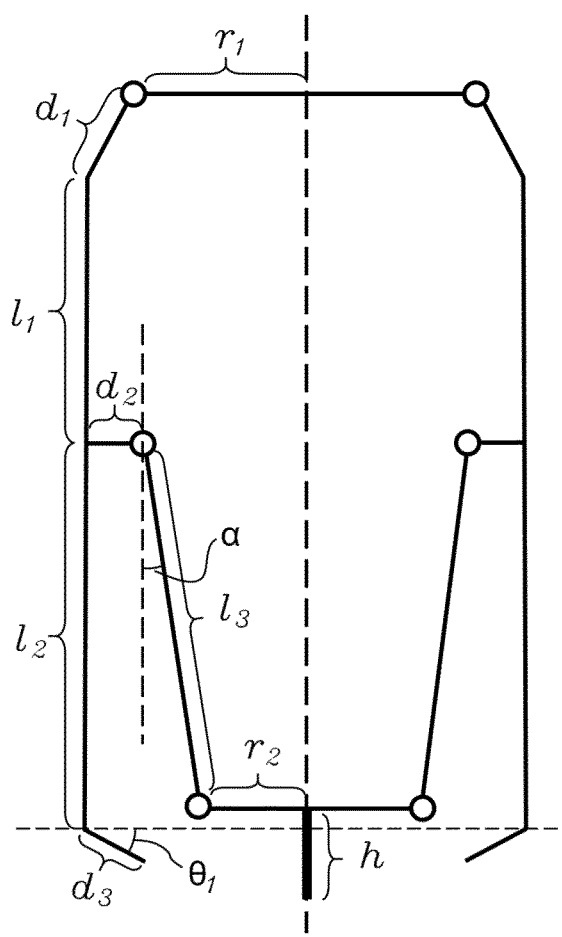
FIG. 20 is a schematic diagram of the support module in a folded state in another embodiment of the present application.

Please also refer to FIGS. 18-20. FIG. 18 is a schematic diagram of the support module in the unfolded state in another embodiment of the present application. FIG. 19 is a schematic diagram of the support module in the unfolded state in further another embodiment of the present application. FIG. 20 is a schematic diagram of the support module in a folded state in another embodiment of the present application.

If a practical structural feature of the support module is taken into account, it can be simplified to a connecting rod structure as shown in the following figures, such as the FIGS. 18-20. Therein, $r_1$ is a distance from the upper end of the support to the connection point between the support and the shell assembly. It is the distance from the connection point between the support member and the shell assembly to the central axis of the support module (as indicated by the vertical dotted line in FIGS. 18-20). $l_1$ is a distance from the upper end of the support member to a connection point between the support member and the connecting member. $l_2$ is a distance from the connection point between the support member and the connecting member to the lower end of the support member. $d_3$ is a distance from the lower end of the support member to a contact position between the support member and the supporting surface. $d_2$ is a distance from the left end of the connecting member to the connection point between the connecting member and the support member. $l_3$ is a length of the connecting member. $r_2$ is a distance from the connection point between the connecting member and the linkage assembly to the central axis of the supporting module. h is a distance that the linkage assembly protrudes downward. $\theta_1$ is an angle between the support member and the horizontal plane. $\theta_2$ is an angle between the connecting member and the horizontal plane. α is an angle between the connecting member and the support member when the support module is in the folded state.

As shown in FIG. 18, in the unfolded state, in order to ensure that the support surface of the support member is flush with the bottom of the middle of the interlocking component, the dimensions of each structure should satisfy:

$$r_1 + d_1 + l_1 \cdot \cos\theta_1 = r_2 + l_3 \cdot \cos\theta_2 + d_2 \cdot \sin\theta_1; \text{ and}$$

$$l_2 \cdot \sin\theta_1 + d_3 = d_2 \cdot \cos\theta_1 + l_3 \cdot \sin\theta_2 + h.$$

As shown in FIG. 19, specifically, if the connecting member is parallel to the supporting surface when the support module is in the unfolded state, the support member can reach the maximum opening angle and the minimum height, at this time, the structure has the greatest stability. The dimensions of each structure should satisfy:

$$r_1 + d_1 + l_1 \cdot \cos\theta_1 = r_2 + l_3 + d_2 \cdot \sin\theta_1; \text{ and}$$

$$l_2 \cdot \sin\theta_1 + d_3 = d_2 \cdot \cos\theta_1 + h.$$

As shown in FIG. 20, when in the folded state, the dimensions of each structure should satisfy:

$$l_3 \cdot \sin\alpha < l_2 + d_3 \cdot \sin\theta_1 < l_3 \cdot \sin\alpha + h,$$

and in order to ensure that the support members can be extended by pushing the linkage assembly when in the merged state, a should be greater than 0°.

In the description of this application, it is need to understand that the term of "the center", "vertical", "horizontal", "length", "width", "thickness" and "up", "down", "before" and "after", "left", "right" and "vertical", "level", "top", "bottom", "inside" and "outside", "clockwise" and "rotate", etc indicating the location or position relationship based on viewing angles as shown in the appended drawings, which is only for the convenience of describing the application and simplifying the description, and does not indicate or imply that the device or component referred to must have a specific orientation, be constructed and operated in a specific orientation. Therefore, it should not be understood as a limitation of the application.

Furthermore, the terms "first" and "second" are only used for descriptive purposes and should not be understood as indicating or suggesting relative importance or implicitly indicating the quantity of the technical features indicated. Thus, a feature that is defined as "first" or "second" can explicitly or implicitly include one or more of such features. In the description of this application, "multiple" means two or more, unless otherwise explicitly and specifically limited. Furthermore, the terms "include" and "have" and any of their variations are intended to cover non-exclusive inclusion.

In this application, unless otherwise explicitly stipulated and limited, terms such as "install", "connect", "fix", etc, should be understood in a broad sense. For example, they can be connection, detachable connection, or integrated. It can be a mechanical connection or an electrical connection. It can be directly connected, or indirectly connected through an intermediate medium. It can be the internal connection of two components or the interaction relationship between two components. For those skilled in the art, they can understand the specific meanings of the above terms in this application according to the specific circumstances.

The above provides a detailed introduction to the implementation mode of this application, elaborates and explains the principle and implementation mode of this application. These explanations are only used to help understand the method and core idea of this application. However, the contents of this specification should not be construed as limiting the present application. Those skilled in the art may make various modifications and variations to the present application without departing from its spirit and scope. These modifications and variations of the present application fall within the scope of the claims of the present application and its equivalent technologies.

What is claimed is:

1. An air outlet device, comprising:
an air outlet module; and
a support module connected with each other;
wherein the air outlet module is configured for blowing air outward, the support module has an unfolded state and a folded state, and the support module includes a linkage assembly and multiple support assemblies, the multiple support assemblies are arranged along a circumferential direction of the linkage assembly and are all connected to the linkage assembly;
wherein when the support module is in the folded state, at least part of the linkage assembly protrudes from the multiple support assemblies along a direction away from the air outlet module, when the linkage assembly is subjected to a force in a direction toward the air outlet module, the linkage assembly moves in a direction close to the air outlet module, and drives the multiple support assemblies to rotate synchronously in directions that are away from each other, thereby placing the support module in the unfolded state and enabling the multiple support assemblies to be supported on a supporting surface.

2. The air outlet device of claim 1, wherein the support module further comprises a shell assembly connected to the air outlet module, the linkage assembly is arranged on a side of the shell assembly away from the air outlet module, each support assembly comprises a support member and a connecting member, the support member is rotatably connected to the shell assembly, and a first end of the connecting member is rotatably connected to the support member, and a second end of the connecting member is rotatably connected to the linkage assembly;
during a process of unfolding the support module, the linkage assembly moves in a direction close to the shell assembly, the second end of the connecting member rotates relative to the linkage component, the first end of the connecting member rotates relative to the support member, and the support member rotates relative to the shell assembly, thus to cause the support member rotates in a direction away from the linkage assembly;
during a process of folding the support module, the linkage assembly moves in a direction away from the shell assembly, the second end of the connecting member rotates relative to the linkage assembly in an opposite direction, the first end of the connecting member rotates relative to the support member in an opposite direction, and the support member rotates relative to the shell component in an opposite direction, thus to cause the support member to rotate in a direction close to the linkage assembly.

3. The air outlet device of claim 2, wherein the support member comprises a side wall and a bottom wall bent to connect the side wall, the side wall is rotatably connected to the shell assembly and the first end of the connecting member, wherein a first snap-on part is provided at the side of the linkage assembly that is away from the shell assembly, and a second snap-on part is provided at the bottom wall;
wherein when the support module is in the folded state, the bottom wall is located at a side of the linkage assembly that is away from the shell assembly, and the first snap-on part and the second snap-on part cooperate with each other so that the support member is connected to the linkage assembly in a snap-on mode.

4. The air outlet device of claim 3, wherein the linkage assembly comprises a bottom shell and an end cover installed on the bottom shell, the first snap-on part is arranged on the bottom shell, the end cover is rotatably connected to the second end of the connecting member, the bottom shell is capable of moving relative to the end cover along its axial direction, and when the support module is in the folded state, the bottom shell is pressed against the supporting surface;
during the process of unfolding the support module, when a pressure is applied to the bottom shell along a direction toward the supporting surface, the bottom shell moves relative to the end cover along the direction close to the shell assembly, thus to cause the first snap-on part to separate from the second snap-on par, wherein the bottom shell further drives the end cover to move along the direction close to the shell assembly, which enables the multiple support assemblies to rotate synchronously in directions that are away from each other.

5. The air outlet device of claim 4, wherein the bottom shell is provided with a top contact part, and there is a distance between the top contact part and the end cover, when the pressure is applied to the bottom shell along the direction toward to the supporting surface, the bottom shell moves relative to the end cover along the direction close to the shell assembly, when the bottom shell moves a first distance relative to the end cover along the direction close to the shell assembly, the first snap-on part separates from the second snap-on part, when the bottom shell moves a second distance relative to the end cover along the direction close to the shell assembly, the top contact part contacts with the end cover, thereby enabling the bottom shell to drive the end cover to move together, wherein the first distance is less than the second distance.

6. The air outlet device of claim 4, wherein the linkage assembly further comprises an elastic member arranged in the bottom shell, the end cover is provided with a guiding part, the elastic member is sleeved on the guiding part and two ends of the elastic member are connected to the end cover and the bottom shell respectively, and the bottom shell is provided with a through hole corresponding to the guiding part;
wherein when the bottom shell moves relative to the end cover along the direction close to the shell assembly, the elastic member is in a compressed state, and the guiding part protrudes from the bottom shell through the through hole; when the bottom shell is separated from the supporting surface, the elastic member in the compressed state can drive the bottom shell to move in a direction away from the shell assembly.

7. The air outlet device of claim 1, wherein the support module further comprises a shell assembly connected to the air outlet module, the linkage assembly is arranged on a side, of the shell assembly, that is away from the air outlet module, the shell assembly comprises a shell and a protruding part arranged on a side, of the shell, that is away from the air outlet module, when the support module is in the unfolded state, the protruding part contacts with the linkage assembly.

8. A fan, comprising:
a base module; and
an air outlet device, comprising:
an air outlet module; and
a support module connected with each other;
wherein the air outlet module is configured for blowing air outward, the support module has an unfolded state and a folded state, and the support module includes a linkage assembly and multiple support assemblies, the multiple support assemblies are arranged along a circumferential direction of the linkage assembly and are all connected to the linkage assembly;
wherein when the support module is in the folded state, at least part of the linkage assembly protrudes from the multiple support assemblies along a direction away from the air outlet module, when the linkage assembly is subjected to a force in a direction toward the air outlet module, the linkage assembly moves in a direction close to the air outlet module, and drives the multiple support assemblies to rotate synchronously in directions that are away from each other, thereby placing the support module in the unfolded state and enabling the multiple support assemblies to be supported on a supporting surface;
wherein the base module is configured to be supported on the supporting surface, and the air outlet device is detachably connected to the base module, when the air outlet device is connected to the base module, the support module is in the folded state and at least part of the support module is located inside the base module, and at least part of the air outlet module is located outside the base module.

9. The fan of claim 8, wherein the support module further comprises a shell assembly connected to the air outlet module, the linkage assembly is arranged on the side of the shell assembly away from the air outlet module, the air outlet module comprises a first electrical connection terminal arranged in the shell assembly, the linkage assembly has a through hole, and when the support module is in the folded state, the multiple supporting assemblies are enclosed to form a containment space, the base module includes a base, a support rod, and a second electrical connection terminal, the base is used to be supported on the supporting surface, the support rod is arranged on the base, and the second electrical connection terminal is arranged inside the support rod;
wherein when the air outlet device is connected to the base module, the end of the support rod passes through the linkage assembly through the through hole, and the first electrical connection terminal and the second electrical connection terminal are connected with each other in the containment space.

10. The fan of claim 9, wherein the shell assembly comprises a shell and a protruding part arranged on the side of the shell away from the air outlet module, and the first electrical connection terminal is arranged in the protruding part, then the support module is in the unfolded state, the end of the protruding part and the first electrical connection terminal protrude from the linkage assembly, a connection hole is provided on the side wall of a part of the protruding part that is protruded from the linkage assembly, and a third electrical connection terminal is connected to the first electrical connection terminal through the connection hole, wherein when the support module is in the unfolded state, a surface, of the protruding part, close to the supporting surface and surfaces, of the multiple support assemblies, close to the supporting surface are in one plane.

11. The fan of claim 8, wherein the support module further comprises a shell assembly connected to the air outlet module, the linkage assembly is arranged on a side of the shell assembly away from the air outlet module, each support assembly comprises a support member and a connecting member, the support member is rotatably connected to the shell assembly, and a first end of the connecting member is rotatably connected to the support member, and a second end of the connecting member is rotatably connected to the linkage assembly;
during a process of unfolding the support module, the linkage assembly moves in a direction close to the shell assembly, the second end of the connecting member rotates relative to the linkage component, the first end of the connecting member rotates relative to the support member, and the support member rotates relative to the shell assembly, thus to cause the support member rotates in a direction away from the linkage assembly;
during a process of folding the support module, the linkage assembly moves in a direction away from the shell assembly, the second end of the connecting member rotates relative to the linkage assembly in an opposite direction, the first end of the connecting member rotates relative to the support member in an opposite direction, and the support member rotates relative to the shell component in an opposite direction, thus to cause the support member to rotate in a direction close to the linkage assembly.

12. The fan of claim 11, wherein the support member comprises a side wall and a bottom wall bent to connect the side wall, the side wall is rotatably connected to the shell assembly and the first end of the connecting member, wherein a first snap-on part is provided at the side of the linkage assembly that is away from the shell assembly, and a second snap-on part is provided at the bottom wall;
wherein when the support module is in the folded state, the bottom wall is located at a side of the linkage assembly that is away from the shell assembly, and the first snap-on part and the second snap-on part cooperate with each other so that the support member is connected to the linkage assembly in a snap-on mode.

13. The fan of claim 12, wherein the linkage assembly comprises a bottom shell and an end cover installed on the bottom shell, the first snap-on part is arranged on the bottom shell, the end cover is rotatably connected to the second end of the connecting member, the bottom shell is capable of moving relative to the end cover along its axial direction, and when the support module is in the folded state, the bottom shell is pressed against the supporting surface;
during the process of unfolding the support module, when pressure is applied to the bottom shell along a direction toward the supporting surface, the bottom shell moves relative to the end cover along the direction close to the shell assembly, thus to cause the first snap-on part to separate from the second snap-on par, wherein the bottom shell further drives the end cover to move along the direction close to the shell assembly, which enables the multiple support assemblies to rotate synchronously in directions that are away from each other.

14. The fan of claim 13, wherein the bottom shell is provided with a top contact part, and there is a distance between the top contact part and the end cover, when the pressure is applied to the bottom shell along the direction toward to the supporting surface, the bottom shell moves relative to the end cover along the direction close to the shell assembly, when the bottom shell moves a first distance relative to the end cover along the direction close to the shell assembly, the first snap-on part separates from the second snap-on part, when the bottom shell moves a second distance relative to the end cover along the direction close to the shell assembly, the top contact part contacts with the end cover, thereby causing the end cover to be driven to move by the bottom shell, wherein the first distance is less than the second distance.

15. The fan of claim 13, wherein the linkage assembly further comprises an elastic member arranged in the bottom shell, the end cover is provided with a guiding part, the elastic member is sleeved on the guiding part and two ends of the elastic member are connected to the end cover and the bottom shell respectively, and the bottom shell is provided with a through hole corresponding to the guiding part;

wherein when the bottom shell moves relative to the end cover along the direction close to the shell assembly, the elastic member is in a compressed state, and the guiding part protrudes from the bottom shell through the through hole; when the bottom shell is separated from the supporting surface, the elastic member in the compressed state can drive the bottom shell to move in a direction away from the shell assembly.

16. The fan of claim 8, wherein the support module further comprises a shell assembly connected to the air outlet module, the linkage assembly is arranged on a side, of the shell assembly, that is away from the air outlet module, the shell assembly comprises a shell and a protruding part arranged on a side, of the shell, that is away from the air outlet module, when the support module is in the unfolded state, the protruding part contacts with the linkage assembly.

* * * * *